United States Patent
Arai

(10) Patent No.: US 11,084,299 B2
(45) Date of Patent: Aug. 10, 2021

(54) PRINTING SYSTEM, IMAGE PROCESSING APPARATUS, AND PRINT METHOD

(71) Applicant: MIMAKI ENGINEERING CO., LTD., Nagano (JP)

(72) Inventor: Wataru Arai, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 16/730,991

(22) Filed: Dec. 30, 2019

(65) Prior Publication Data

US 2020/0230974 A1 Jul. 23, 2020

(30) Foreign Application Priority Data

Jan. 18, 2019 (JP) .............................. JP2019-006693

(51) Int. Cl.
  *B41J 2/21* (2006.01)
  *B41J 2/205* (2006.01)

(52) U.S. Cl.
  CPC ........... *B41J 2/2135* (2013.01); *B41J 2/2054* (2013.01); *B41J 2/2121* (2013.01)

(58) Field of Classification Search
  CPC ...... B41J 2/2135; B41J 2/2054; B41J 2/2121; B41J 2/01; B41J 3/543; B41J 29/393; H04N 1/4053; G06T 5/002
  USPC .......................................................... 347/19
  See application file for complete search history.

(56) References Cited

U.S. PATENT DOCUMENTS

| 8,542,409 B2 | 9/2013 | Wakayama et al. |
| 2010/0259793 A1 * | 10/2010 | Wakayama ............ H04N 1/405 358/3.03 |
| 2012/0182586 A1 | 7/2012 | Harayama |

FOREIGN PATENT DOCUMENTS

| EP | 1343305 | 9/2003 |
| JP | 2011071882 | 4/2011 |
| WO | 2006041812 | 4/2006 |

OTHER PUBLICATIONS

"Search Report of Europe Counterpart Application", dated Jun. 2, 2020, pp. 1-8.

* cited by examiner

*Primary Examiner* — Huan H Tran
*Assistant Examiner* — Alexander D Shenderov
(74) *Attorney, Agent, or Firm* — JCIPRNET

(57) ABSTRACT

A printing system is provided and includes an image processing portion that generates a generated image by image processing, and a printing portion that performs printing on a medium based on the generated image. The image processing portion generates the generated image by performing a quantization processing that performs quantization by comparing the pixel value of each pixel in the input image with a threshold, and in the quantization processing, calculates a dot influence value indicating to what extent a position corresponding to a selected pixel is covered by the ink dots formed at the position set on the medium in correspondence with the peripheral pixels of the selected pixel, performs adjustment of reflecting the dot influence value on at least one of the pixel value of the selected pixel or the threshold, and compares the pixel value and the threshold based on a value after adjustment.

13 Claims, 13 Drawing Sheets

PRINTING SYSTEM, IMAGE PROCESSING APPARATUS, AND PRINT METHOD

CROSS REFERENCE TO RELATED APPLICATIONS

This application claims the priority benefit of Japanese Patent Application No. 2019-006693, filed on Jan. 18, 2019. The entirety of the above-mentioned patent application is hereby incorporated by reference herein and made a part of this specification.

TECHNICAL FIELD

The present disclosure relates to a printing system, an image processing apparatus, and a print method.

DESCRIPTION OF THE BACKGROUND ART

Conventionally, printing apparatuses such as an inkjet printer have been widely used. In order to print (output) an image with a printing apparatus such as an inkjet printer, quantization processing on the image usually becomes necessary. In this case, the quantization processing is, for example, a processing of converting an image input as an image to be printed into a gradation number that can be expressed by the printing apparatus. For example, a dither method, an error diffusion method, and the like are widely used as a method for the quantization processing. Furthermore, conventionally, a method of performing a quantization processing using the characteristics of both the dither method and the error diffusion method is also known (see e.g., Japanese Unexamined Patent Publication No. 2011-71882, i.e., Patent Literature 1).

Patent Literature 1: Japanese Unexamined Patent Publication No. 2011-71882

SUMMARY

When printing is performed by an inkjet printer, the printing quality may vary greatly depending on how the quantization processing is performed. Therefore, in order to perform printing with higher quality, it is desired to perform the quantization processing through a more appropriate method. The present disclosure thus provides a printing system, an image processing apparatus, and a print method capable of solving the problems described above.

The inventor of the present application intensively studied the quantization processing that enables printing with higher quality. Then, it has been found that when the quantization processing is performed through the conventional method, concentration unevenness may occur due to the overlapping of adjacent ink dots. Furthermore, it has been found that such concentration unevenness may cause a feeling of roughness when expressing, for example, the skin of a person.

It has also been found, through further diligent research, that the occurrence of such concentration unevenness can be suppressed and printing with higher quality can be carried out by performing the quantization processing in consideration of the extent of overlapping of adjacent ink dots. More specifically, as a way of considering the extent of overlapping of adjacent ink dots, it has been found that the quantization processing can be appropriately performed by calculating a value indicating how much of the position corresponding to the pixel (selected pixel) to be selected for quantization target is covered by the ink dots formed at the periphery thereof and performing the quantization processing using such value. The inventor of the present application has found, through further intensive research, the features necessary for obtaining such effects and contrived the present disclosure.

In order to solve the above problems, the present disclosure provides a printing system that performs printing on a medium through an inkjet method, the printing system including an image processing portion that performs image processing on an input image that indicates an image to be printed, the image processing portion generating an image in which a gradation number of a pixel value is smaller than the input image as a generated image which is an image generated by the image processing portion; and a printing portion that executes printing on the medium based on the generated image generated by the image processing; where the printing portion includes an inkjet head that ejects ink onto the medium, the inkjet head forming ink dots on the medium by ejecting ink to a position set on the medium in correspondence with each pixel in the generated image; the image processing portion generates the generated image by performing a quantization processing for performing quantization by comparing a pixel value of each pixel in the input image with a preset threshold; and in the quantization processing, calculates a dot influence value which is a value indicating to what extent the position corresponding to a selected pixel, which is a pixel of the input image selected as a target of quantization, is covered by the ink dot formed at the position set on the medium in correspondence with a peripheral pixel of the selected pixel, performs adjustment that reflects the dot influence value on at least one of the pixel value of the selected pixel or the threshold, and compares the pixel value with the threshold based on a value after adjustment.

According to such a configuration, for example, the quantization processing can be appropriately performed in consideration of the extent of overlapping of ink dots formed proximate to each other on the medium. Furthermore, printing with higher quality can be appropriately performed by performing printing in the printing portion based on the generated image generated by performing such quantization processing.

Here, in this configuration, the image processing portion is, for example, a processing portion that performs RIP processing in accordance with the configuration of the printing portion. In this case, for example, the image processing portion performs the quantization processing as a quantization processing performed in the RIP processing. More specifically, in this case, the image processing portion performs, for example, processing such as a separation processing, a resolution conversion processing, a quantization processing, and a commanding with respect to an image to be processed in the operation of the RIP processing. In this case, for example, an image after being subjected to the separation processing and the resolution conversion processing can be considered as an input image of the quantization processing. In the RIP processing, processing other than the quantization processing can be performed, for example, same as or similar to the processing in the known RIP processing.

In this configuration, the image processing portion calculates the dot influence value based on, for example, a dot model which is data obtained by modeling a relationship between the size of the ink dot and the printing resolution. In this case, the dot model is, for example, a model that indicates, with respect to one ink dot formed at the position of one pixel in the resolution, to what extent the ink dots cover the positions of pixels other than the one pixel. According to such a configuration, for example, the extent of overlapping of ink dots formed close to each other on the medium can be appropriately taken into consideration.

Furthermore, in an image to be printed, for example, consideration is made to change the influence caused by the overlapping of adjacent ink dots according to the gradation at the position where the dots are formed. Therefore, in the configuration, the image processing portion preferably changes the extent of reflecting the dot influence value according to, for example, the pixel value of the selected pixel. More specifically, in this case, for example, the image processing portion reflects the dot influence value at a proportion that changes according to the pixel value of the selected pixel, and performs quantization on the selected pixel. More specifically, in this case, for example, the image processing portion reflects the dot influence value based on a dot influence value usage rate which is a positive coefficient indicating a proportion to reflect the dot influence value in a quantization operation with respect to the selected pixel and which indicates reflecting more dot influence value the larger the value to perform adjustment based on the dot influence value with respect to at least one of the pixel value of the selected pixel or the threshold. According to such a configuration, for example, the quantization corresponding to the gradation of the image can be more appropriately performed.

Furthermore, when quantization is performed by reflecting the dot influence value, for example, if the reflection amount of the dot influence value in the halftone portion is too large, pattern noise such as a checkered pattern or the like, for example, may occur. The halftone portion is, for example, a gradation range including a central gradation among the gradations indicated by pixel values of pixels of the pixels in an input image. Therefore, it is preferable to use as the dot influence value usage rate, for example, a coefficient that changes so that the value in the halftone portion becomes smaller than the value in at least one part of the highlight portion and the value in the halftone portion becomes smaller than the value in at least one part of the shadow portion. The highlight portion is, for example, a gradation range (bright range) having a smaller pixel value than the halftone portion. The shadow portion is, for example, a gradation range (dark range) having a larger pixel value than the halftone portion. According to such a configuration, for example, the occurrence of pattern noise, and the like in halftone can be appropriately prevented. Thus, for example, quantization corresponding to the gradation of an image can be performed more appropriately.

When the dot influence value usage rate is a positive coefficient, it can be considered as, for example, a substantially positive coefficient. More specifically, for example, in the image processing portion, it is conceivable to formally use a negative value parameter as a parameter corresponding to the dot influence value usage rate due to convenience of calculation, and the like. In this case, the absolute value of the parameter can be considered as the dot influence value usage rate.

Further, it is preferable that the quantization be performed in further consideration of errors caused by quantization other than the dot influence value. In this case, for example, the image processing portion performs quantization on the selected pixel based further on a peripheral error value which is a value based on an error caused by quantization on each of a plurality of pixels at the periphery of the selected pixel. According to such a configuration, for example, the quantization can be more appropriately performed. Furthermore, in the configuration, when the quantization is performed in consideration of the peripheral error value, for example, the error is considered in the same or similar manner as a known error diffusion method or average error minimum method. In this case, for example, the image processing portion performs the quantization by reflecting the peripheral error value based on an error usage rate which is a coefficient indicating a proportion to reflect the peripheral error value in the quantization operation with respect to the selected pixel.

In addition, when quantization corresponding to the gradation of the image is performed, it may be preferable to perform quantization through the dither method depending on the gradation of the image. Therefore, in the image processing portion, for example, quantization may be performed by further using a dither matrix noise which is noise specified by a preset dither matrix. In this case, for example, the quantization is performed by reflecting the dither matrix noise based on a noise usage rate which is a coefficient indicating a proportion to reflect the dither matrix noise in the quantization operation with respect to the selected pixel. According to such a configuration, for example, the quantization corresponding to the gradation of the image can be more appropriately performed. It is conceivable to use, as a noise usage rate, for example, a positive coefficient indicating to reflect more dither matrix noise the larger the value. In this case, for example, in the halftone portion, it is conceivable to use a coefficient or the like that changes so that a value near the central gradation becomes larger than the value in other parts. According to such a configuration, for example, the occurrence of pattern noise, and the like in halftone can be more appropriately prevented.

In this configuration, for example, the image processing portion performs only one quantization with respect to each pixel in the input image in the quantization operation corresponding to one type of ink. Performing only one quantization means, for example, performing scanning (scanning) of sequentially selecting a pixel as a selected pixel so that each pixel is selected only once. According to such configuration, for example, the quantization processing can be performed at higher speed compared with a case where the scanning for selecting a pixel is repeated over a plurality of times.

In this configuration, it is conceivable to perform the quantization performed on the respective selected pixel, for example, in consideration of only the influence of the ink dots corresponding to the pixels where quantization has been completed by that time point. More specifically, in this case, the image processing portion, for example, calculates, as the dot influence value used in the quantization with respect to the selected pixel, a value indicating to what extent the position corresponding to the selected pixel is covered by the ink dot formed at a position corresponding to a pixel where quantization has already been completed before performing quantization on the selected pixel. According to such a configuration, for example, the quantization that takes into consideration the dot influence value can be more easily and appropriately performed. In this case, for example, the quantization that takes into consideration the dot influence value can be appropriately carried out without repeating the scanning for selecting a pixel over a plurality of times.

Furthermore, in this configuration, for example, it is conceivable to use a configuration capable of forming ink dots of a plurality of sizes as the printing portion. In this case, for example, the image processing portion performs the quantization operation for every size of the ink dot to generate the generated image indicating the position to form the ink dot of each size. The quantization operation performed for each size of the ink dot size is performed, for example, in order from the quantization operation corresponding to a large size. According to this configuration, for example, printing with higher quality can be appropriately performed by preferentially determining the positions of large ink dots that have a large influence on graininess and the like. Furthermore, in this case, in the quantization operation corresponding to each size, for example, the image processing portion performs quantization while handling a position where an ink dot of a larger size is determined to be formed as a position where an ink dot of a size being processed is formed. According to such a configuration, for example, the quantization that takes into consideration the influence of a larger ink dot can be appropriately performed while appropriately suppressing the complexity of processing and the like.

In this configuration, for example, the printing portion can be considered to perform printing using inks of a plurality of colors. In this case, it is considered to use, for at least some colors, a dark ink which is an ink having a relatively dark color, and a light ink, which is an ink having a relatively light color. More specifically, in this case, for example, the printing portion includes, for at least some colors, a dark ink head which is an inkjet head that ejects dark ink, and a light ink head which is an inkjet head that ejects light ink. In the image processing portion, for example, the image processing portion performs a quantization operation for determining a position to eject the dark ink by the dark ink head, and a quantization operation for determining a position to eject the light ink by the light ink head. In this case, the influence of overlapping of adjacent ink dots is considered to become larger in the dark ink of the dark ink and the light ink. Therefore, it is preferable to perform quantization using the dot influence value as the quantization operation for determining the position to eject the dark ink. According to such configuration, for example, the quantization operation for dark ink can be more appropriately performed in consideration of the influence of overlapping of adjacent ink dots.

Further, in this case, the influence of overlapping of adjacent ink dots becomes relatively small for the light ink. Thus, it may be preferable to, for example, perform the quantization processing at a higher speed than to consider such an influence. In this case, it is considered to perform quantization through a dither method using the dither matrix noise without using the dot influence value, for example, as a quantization operation for determining the position to eject the light ink. According to such configuration, for example, the quantization operation for light ink can be performed at high speed and appropriately.

Furthermore, consideration can also be made to using an image processing apparatus having features similar to the above, a print method, or the like for the configuration of the present disclosure. In this case as well, for example, effects similar to the above can be obtained.

According to the present disclosure, for example, printing with high quality can be appropriately carried out.

BRIEF DESCRIPTION OF THE DRAWINGS

FIG. 1A shows an example of a configuration of the printing system 10. FIG. 1B is a flowchart illustrating an example of image processing performed in an image processing apparatus 12.

FIG. 2A shows one example of dither processing. FIG. 2B shows one example of error diffusion processing. FIG. 2C shows one example of quantization processing in hybrid processing.

FIG. 3A shows one example of a quantization processing performed in the image processing apparatus 12 of the present example. FIG. 3B shows one example of a way to reflect a dot model through a method different from the present example.

FIGS. 4A and 4B are views describing a protrusion amount of dots considered in the dot model of the reference example.

FIG. 6A shows one example of an effect obtained by using the dot model. FIG. 6B shows a comparison of the dot arrangement in the case of the equal ratio resolution and the dot arrangement in the case of the different ratio resolution.

FIG. 7A shows one example of a selected pixel 210 selected in the quantization operation corresponding to an M size. FIG. 7B shows an example of the quantization operation for M dots performed through a method different from the present example. FIG. 7C shows one example of the quantization operation for M dots performed in the present example.

FIG. 8A shows one example of the manner of determining the output proportion of the dots of each size for a case where quantization for each size is performed without considering the arrangement of dots of a larger size. FIG. 8B shows one example of the manner of determining the output proportion in the present example.

FIGS. 10A and 10B show one example of the result of performing quantization through a method different from the method of the present example. FIG. 10C shows one example of the result of performing quantization through the method of the present example.

DETAILED DESCRIPTION OF EMBODIMENTS

Figure 1A:
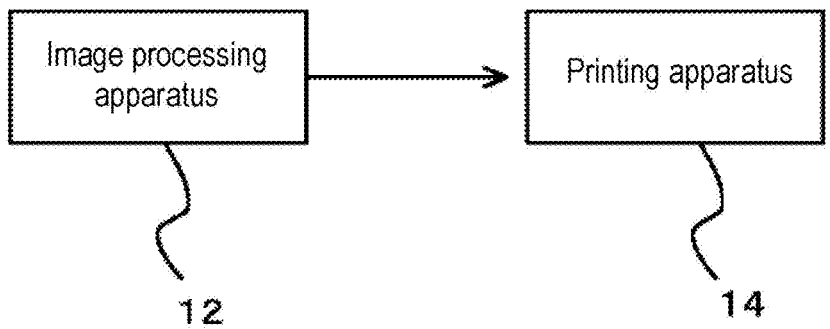
FIGS. 1A and 1B are views describing a printing system 10 according to one embodiment of the present disclosure.
Figure 1B:
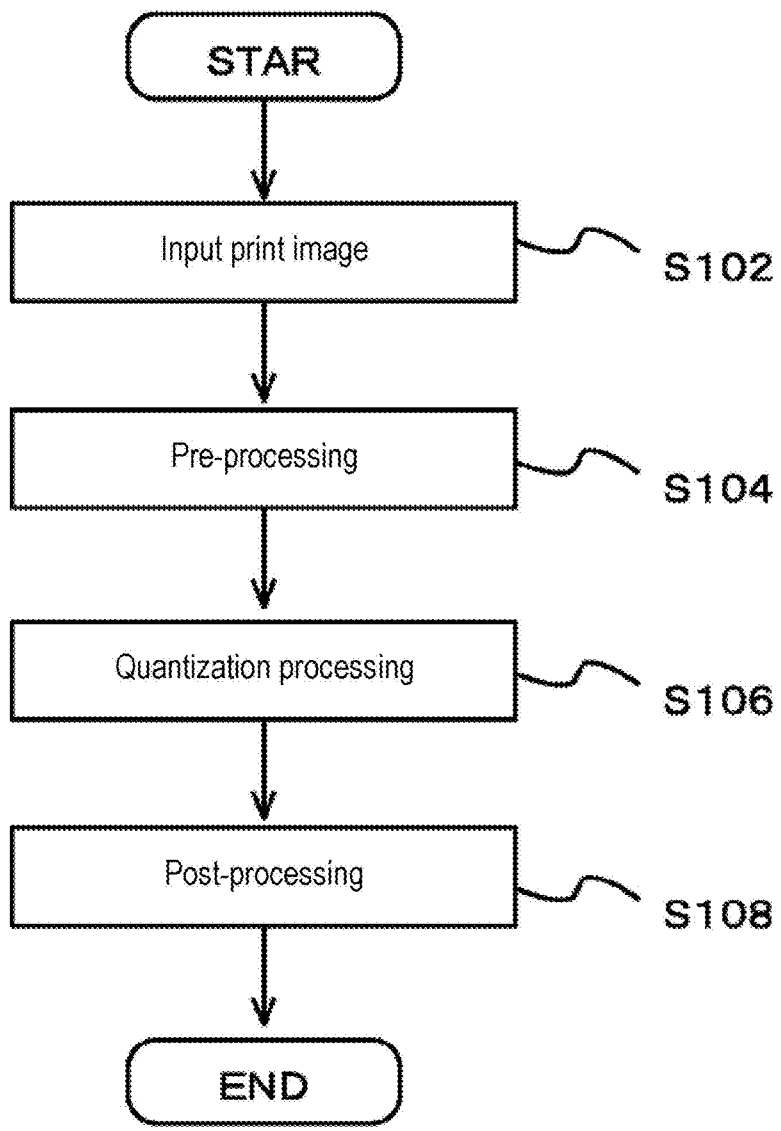

Hereinafter, an embodiment according to the present disclosure will be described with reference to the drawings. FIGS. 1A and 1B are views describing a printing system 10 according to one embodiment of the present disclosure. FIG. 1A shows an example of a configuration of the printing system 10. In the present example, the printing system 10 is a printing system that performs printing on a medium (medium), which is a target object to be printed, through an inkjet method, and includes an image processing apparatus 12 and a printing apparatus 14. Various known media can be used as the medium. Other than the points described above, the printing system 10 may have features same as or similar to the known printing systems.

The image processing apparatus 12 has a configuration of functioning as an image processing portion in the printing system 10, and operates according to a predetermined program to form an image to provide to the printing apparatus 14 by predetermined image processing. More specifically, in the present example, the image processing apparatus 12 generates a post-RIP processing image which is an image indicating an image in a format that can be processed by the printing apparatus 14 by performing RIP processing according to the configuration of the printing apparatus 14 on a print image indicating an image to be printed. In the RIP processing, at least a quantization processing is performed on the pixel values of the pixels configuring the image. The quantization processing will be described in more detail later.

The printing apparatus 14 has a configuration of functioning as a printing portion in the printing system 10, and executes printing on a medium by performing the operation of printing according to the post-RIP processing image received from the image processing apparatus 12. The printing apparatus 14 is an inkjet printer that performs printing through an inkjet method, and includes an inkjet head that ejects ink onto a medium. More specifically, in the present example, the printing apparatus 14 is, for example, an inkjet printer that performs color printing using a plurality of colors of ink, and includes a plurality of inkjet heads that respectively eject different colors of ink. In this case, it is conceivable to use as the plurality of colors, for example, a plurality of colors (e.g., cyan, magenta, yellow, and black) configuring a process color that is a basic color for color representation. Furthermore, in the present example, as the inkjet head for each color, an inkjet head capable of forming ink dots of a plurality of sizes is used. The inkjet head capable of forming ink dots of a plurality of sizes can be considered as, for example, an inkjet that forms variable dots (VD) which are dots whose sizes can be changed.

Subsequently, the image processing performed in the image processing apparatus 12 will be described in more detail. FIG. 1B is a flowchart illustrating an example of image processing performed in an image processing apparatus 12. As described above, in the present example, the image processing apparatus 12 performs the RIP processing on the print image indicating the image to be printed to generate a post-RIP processing image indicating the image in a format that can be processed by the printing apparatus 14. In this case, it is conceivable to use as the print image, for example, an image in a format that does not depend on the configuration of the printing apparatus 14 (e.g., a general-purpose format).

More specifically, in the operation of RIP processing, the image processing apparatus 12 accepts input of a print image (S102), and performs necessary pre-processing on the input image in accordance with subsequent processing (S104). It can be considered, for example, that the input of the input image is accepted from the outside of the image processing apparatus 12 using a network, a storage medium, or the like. Furthermore, the input image may be accepted by generating the input image in the image processing apparatus 12 by a user operation or the like.

Furthermore, as pre-processing, it is conceivable to perform the processing same as or similar to the pre-processing performed in the known RIP processing. More specifically, as at least a part of the pre-processing, for example, it is conceivable to perform a separation processing for separating a print image into data for each color of ink used in the printing apparatus 14, a resolution conversion processing for converting the resolution of the print image or the image after the separation processing according to the resolution on the printing executed in the image processing apparatus 12, and the like. Moreover, in the present example, it is considered to further set various parameters to use in the quantization processing, to be performed later, in the pre-processing.

Furthermore, in the present example, the image processing apparatus 12 performs a quantization processing on an image of an image generated by such pre-processing (image after pre-processing) (S106). In this case, the image after the pre-processing can be considered as an input image of the quantization processing. More specifically, for example, when the separation processing or the like is performed as described above in the pre-processing, the image after the pre-processing corresponding to ink of each color can be considered as the input image of the quantization processing. Furthermore, in this case, it is conceivable to perform quantization on the pre-processed image corresponding to the ink of each color in the quantization processing. Moreover, the quantization processing is, for example, a processing for reducing the gradation number by comparing a pixel value of each pixel in the input image with a preset threshold. The quantization processing can also be considered as, for example, a processing of converting a continuous numerical value into a discrete numerical value (discrete value). In this case, the continuous numerical value may be, for example, a numerical value that can be considered continuous compared to a discrete value obtained by quantization.

In this case, the input image can be considered as an example of an image indicating an image to be printed. Furthermore, the quantization processing performed in the image processing apparatus 12 can be considered as, for example, an example of image processing with respect to an input image. Moreover, the post-quantization image, which is an image generated by the quantization processing on the input image, is an example of a generated image generated by image processing in the image processing apparatus 12. The quantization processing can be considered as, for example, a processing for generating a generated image in which the gradation number of the pixel value is made smaller than that of the input image. The quantization processing performed in the present example will be described later in more detail.

Furthermore, following the quantization processing, the image processing apparatus 12 performs a predetermined post-processing on the post-quantization image to generate a post-RIP processing image. As post-processing, for example, it is conceivable to perform command processing for converting the format of the image so that the image is indicated using a command executable by the printing apparatus 14. According to the present example, the RIP processing, and the like on the print image can be appropriately performed. Furthermore, in this case, the printing apparatus 14 can be caused to appropriately execute the operation of printing by providing the post-RIP processing image to the printing apparatus 14.

Among the RIP processing performed in the image processing apparatus 12 of the present example, processing other than the quantization processing can be performed, for example, in the same or similar manner as the processing in the known RIP processing. Furthermore, as can be understood from the above description and the like, in the present example, a post-RIP processing image is generated based on the post-quantization image generated by the quantization processing. Therefore, the operation of the printing apparatus 14 can be considered as an operation for executing printing on a medium based on the post-quantization image, and the like.

In the present example, the post-RIP processing image can be considered as, for example, data indicating the position where ink is ejected by the inkjet head. In the post-processing in the RIP processing, for example, it may be possible to perform only a formal processing such as image format conversion. In this case, the post-quantization image can be considered as data indicating the position where ink is ejected by the inkjet head. Furthermore, in this case, the inkjet head in the printing apparatus 14 forms ink dots on the medium by ejecting ink to positions set on the medium corresponding to the respective pixels in the post-quantization image.

In the present example, the printing system 10 is configured by a plurality of apparatuses, the image processing apparatuses 12 and the printing apparatus 14. However, in a modified example of the printing system 10, the printing system 10 may be configured with only one apparatus. In this case, for example, it is conceivable to configure the printing system 10 by the printing apparatus 14 that also functions as the image processing apparatus 12.

Figure 2A:
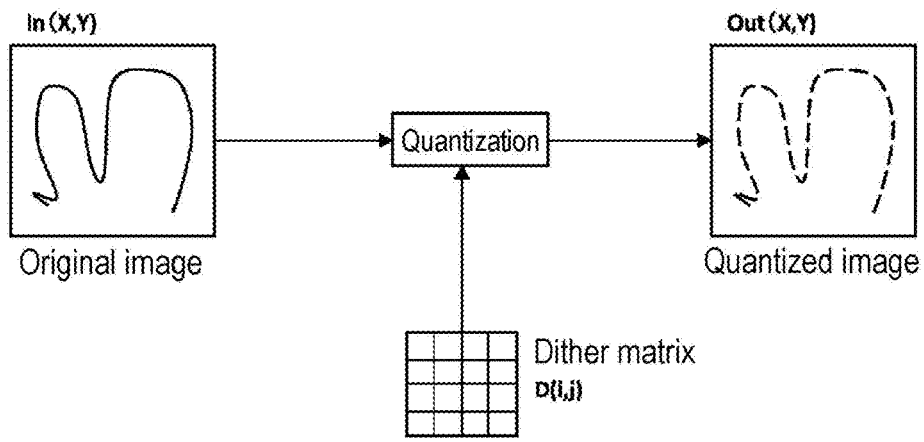
FIGS. 2A to 2C are views showing an example of a quantization processing performed through a method different from the present example.
Figure 2B:
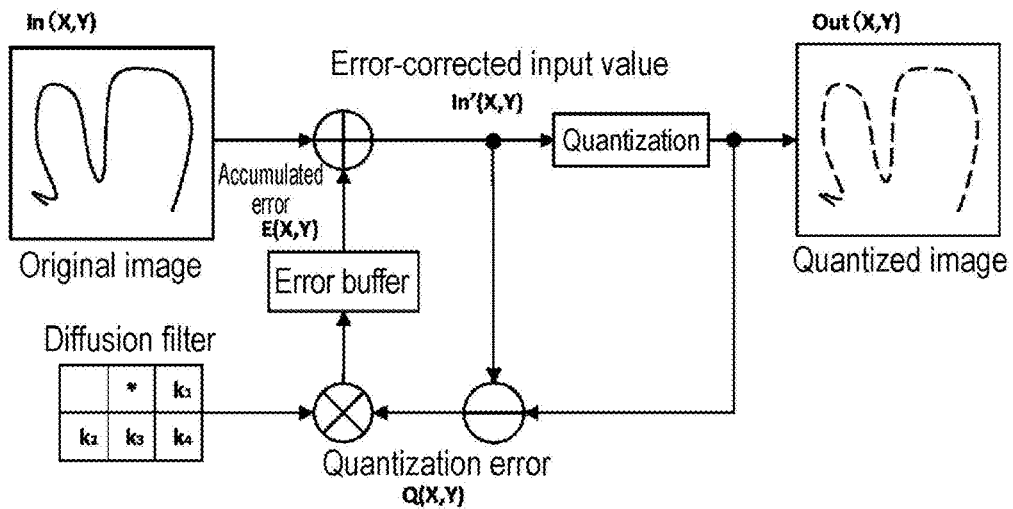
Figure 2C:
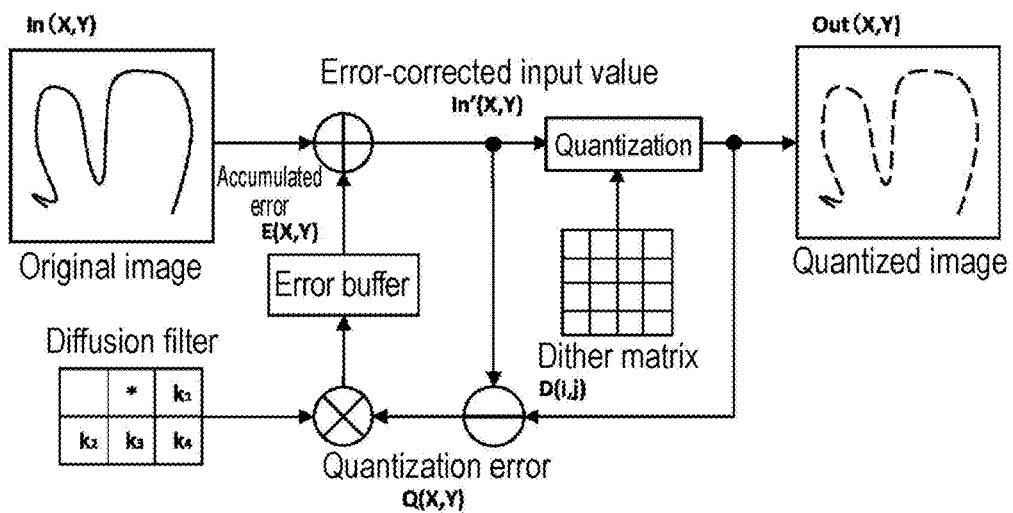

Next, the quantization processing carried out in the present example will be described in more detail. First, for the sake of convenience of explanation, an example of the quantization processing performed through a method different from the present example will be described. FIGS. 2A to 2C are views showing an example of a quantization processing performed through a method different from the present example. FIG. 2A shows an example of the quantization processing (dither processing) by the dither method. In this case, the dither method is, for example, a method (ILL diffusion) of performing quantization using dither matrix noise which is noise specified by a preset dither matrix. More specifically, in this case, for example, the value (dither matrix noise) acquired from the dither matrix is added to the threshold to be compared with the pixel value, thereby performing quantization while fluctuating the threshold. When the dither processing is used, the processing becomes simple, and thus the processing can be performed at high speed. Furthermore, as a characteristic of the dither processing, it is also known that, for example, dot dispersion in a highlight portion and a shadow portion can be improved. In this case, the highlight portion is, for example, a gradation range (bright range) having a smaller pixel value than a halftone portion. The halftone portion is, for example, a gradation range including a central gradation among the gradations indicated by pixel values of pixels of the pixels in an input image of the quantization processing. Furthermore, the shadow portion is, for example, a gradation range (dark range) having a larger pixel value than the halftone portion. However, the dither processing does not take into account errors caused by quantization, so that the gradation after processing is less likely to be smooth. Furthermore, for example, repeated stripes (dither stripes) are likely to occur in the halftone portion.

FIG. 2B shows an example of the quantization processing (error diffusion processing) by the error diffusion method. As described above, in the dither processing, the threshold is fluctuated by adding a fixed value preset in the dither matrix to the threshold. On the other hand, in the error diffusion processing, the relationship between the pixel value and the threshold is fluctuated using a value determined according to the input image of the quantization processing instead of a fixed value. More specifically, in the error diffusion processing, for example, quantization is performed by reflecting a quantization error generated according to the result of the quantization by feeding it back to the subsequent input value (input concentration). The quantization error is, for example, a difference that occurs between an input value and an output value of quantization for the pixel value of each pixel. More specifically, in the error diffusion processing, for example, the quantization on each pixel is carried out while diffusing an error (quantization error) between the original pixel value and the processed pixel value to unprocessed peripheral pixels every time quantization is performed on one pixel. In this case, the quantization error is fed back to the input value by adding to the input value the accumulated error generated by quantization in the pixel where quantization has already been completed among the peripheral pixels of each pixel. In this case, the accumulated error is a value obtained by accumulating the quantization error diffused based on the error diffusion filter.

With this configuration, for example, a more natural gradation can be obtained by feeding back the quantization error to the input value. Furthermore, repeated stripes as in the case of dither processing do not occur. However, the error diffusion processing is more complicated in processing than the dither processing, for example, and hence the processing speed is reduced. Furthermore, in the error diffusion processing, for example, a unique pattern such as worm noise is likely to occur. Moreover, dot delay is likely to occur in the highlight portion and the shadow portion.

On the other hand, in the example shown in FIG. 2C, the occurrence of problems when the dither processing and the error diffusion processing is used alone is suppressed by performing hybrid processing, which is a quantization processing combining features of dither processing (dither characteristics) and error diffusion processing (error diffusion characteristics). FIG. 2C shows one example of quantization processing in hybrid processing. As can be understood from the illustrated matters and the like, the hybrid processing can be considered as a processing using a dither matrix similar to the dither processing, for example, in a configuration in which the error diffusion processing is performed. More specifically, the hybrid processing may be executed in a manner same as or similar to the processing disclosed in, for example, Japanese Unexamined Patent Publication No. 2011-71882 (Patent Literature 1). When the hybrid processing is performed, for example, worm noise, dot delay, and the like can be appropriately suppressed by, for example, giving influence of the dither matrix to the error diffusion processing.

Furthermore, in this case, quantization in a processing more suitable for the input value can be carried out by using the dither characteristic and the error diffusion characteristic at a proportion that changes in accordance with the input value (gradation). More specifically, in this case, for example, it is conceivable to mainly use the dither characteristic in the highlight portion and the shadow portion. In the halftone portion, it is conceivable to mainly use the error diffusion characteristics. Furthermore, between the highlight portion and the halftone portion, between the halftone portion and the shadow portion, and the like, it is conceivable to use both characteristics while gradually changing the proportion of using the dither characteristic and the proportion of using the error diffusion characteristic. According to such a configuration, for example, the quantization processing utilizing the advantages of the dither processing and the error diffusion processing can be appropriately performed.

Here, as described above, various methods can be used in the quantization processing performed in the RIP processing. However, depending on the quality required for printing, and the like, it is sometimes desired to perform the quantization processing through a method different from the above. More specifically, as described above, when the quantization processing in the hybrid processing is carried out, the quantization processing utilizing the advantages of the dither processing and the error diffusion processing can be appropriately carried out. However, when printing with higher quality is desired, it may be preferable to further use characteristics other than the dither characteristics and the error diffusion characteristics.

More specifically, the inventor of the present application has found through intensive researches that in a case where quantization processing is performed through the conventional method, concentration unevenness may occur due to the influence of overlapping of ink dots formed close to each other on a medium. Furthermore, it has been found that such concentration unevenness may cause a feeling of roughness when expressing, for example, the skin of a person. The inventor of the present application has found, through further intensive researches, that printing with higher quality can be carried out while suppressing the occurrence of such concentration unevenness by performing the quantization processing in consideration of the extent of overlapping of adjacent ink dots. Moreover, it is conceivable to use a dot model as the quantization processing performed in such a manner.

Figure 3A:
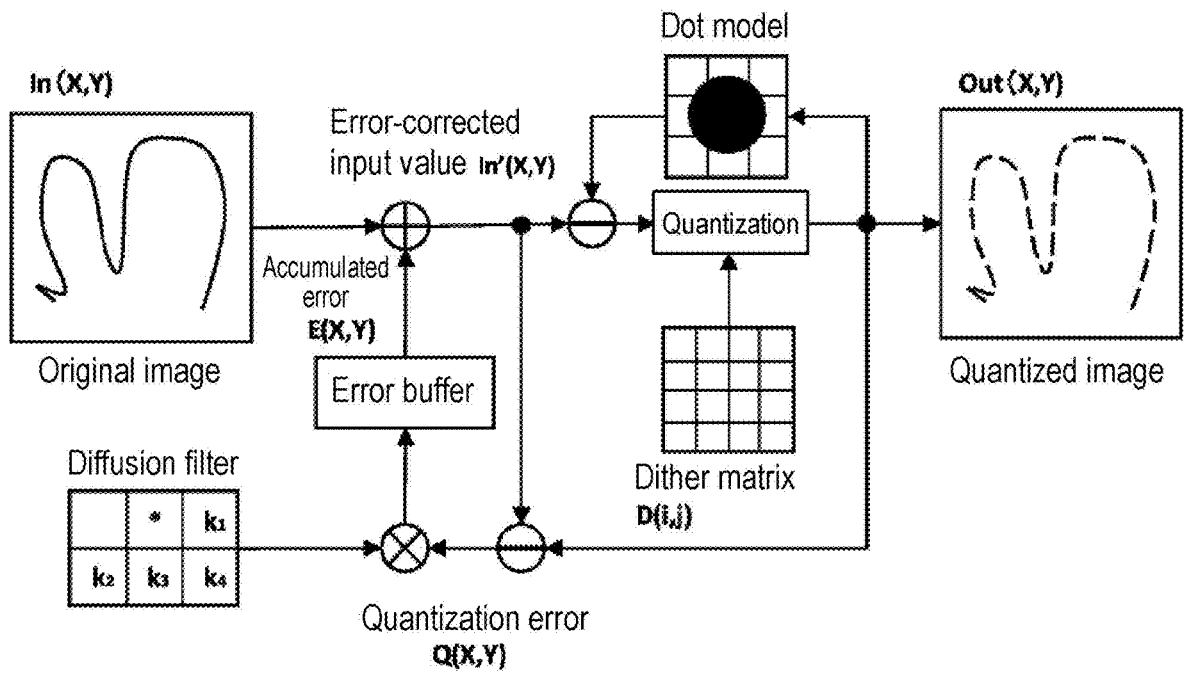
FIGS. 3A and 3B are views describing a quantization processing using a dot model.
Figure 3B:
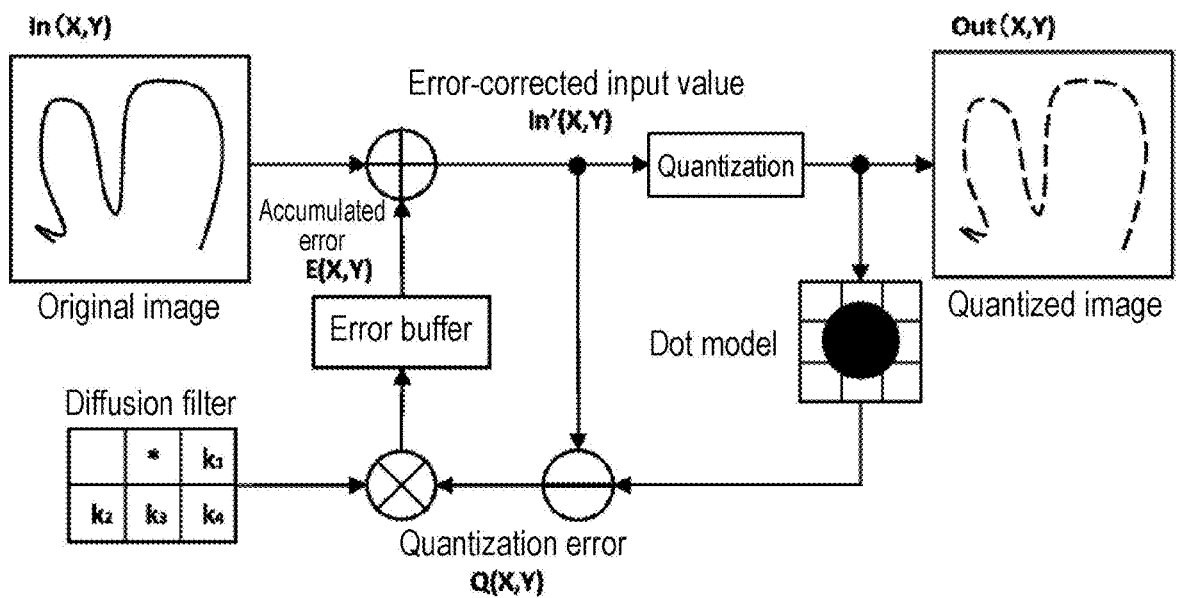

FIGS. 3A and 3B are views describing a quantization processing using a dot model. FIG. 3A shows an example of the quantization processing performed in the image processing apparatus 12 (see FIGS. 1A and 1B) of the present example. As can be understood from the figure, the quantization processing performed in this example is obtained by adding a feedback processing using a dot model to the hybrid processing described with reference to FIG. 2C. In this case, the method of the present example can also be considered as a method in which the hybrid processing described with reference to FIG. 2C is further developed. However, in the following, for the sake of convenience of explanation, when hybrid processing is simply referred to, it is to indicate the hybrid processing described with reference to FIG. 2C.

Furthermore, in the present example, as the dot model, a model indicating how much the dot covers the position of the peripheral pixels for one ink dot formed at the position of one pixel in the resolution is used. In this case, the position of a pixel is, for example, a square-like region determined according to the printing resolution. This square-like region can be considered as a region corresponding to the minimum unit in the printing resolution. Furthermore, the dot model may be considered as, for example, a model indicating how much the dot covers the position of a pixel other than one pixel for one ink dot formed at the position of one pixel in the resolution. More specifically, in the present example, as the dot model, data obtained by modeling the relationship between the ink dot size and the printing resolution is used. For example, the extent of overlapping of ink dots formed close to each other on the medium can be appropriately considered by using such a dot model. The dot model can be considered as, for example, a model created based on the dot diameter (diameter) and the printing resolution. In this case, for example, it is conceivable to use a model that calculates a proportion of protruding to the positions of peripheral pixels (protruding proportion) when the entire dot is assumed as one. The dot model used in the present example will be described in more detail later using a specific example.

In the present example, the image processing apparatus 12 sequentially selects each pixel of the input image, and quantizes the pixel value of the selected pixel which is the selected pixel. The selected pixel can be considered as, for example, a pixel of an input image selected as a quantization target. More specifically, in this case, the image processing apparatus 12, for example, calculates a dot influence value (dot model influence value) which is a value indicating how much the position corresponding to the selected pixel is covered by the ink dots formed at the periphery of the selected pixel based on the dot model. The ink dots formed at the periphery of the selected pixel are, for example, ink dots formed at positions set on the medium in correspondence with the peripheral pixels of the selected pixel. Then, the input value is adjusted based on the dot influence value by performing subtraction of subtracting a value corresponding to the dot influence value from an input value obtained by adding a value corresponding to the accumulated error. Furthermore, the quantization with respect to the selected pixel is carried out by comparing an input value after adjustment and a threshold. In this case, for example, a threshold that has been adjusted based on the dither matrix is used similarly to the threshold used in the hybrid processing as the threshold.

According to such a configuration, for example, feedback processing for reducing overlapping of dots can be appropriately carried out. Furthermore, for example, the quantization processing can be performed more appropriately in consideration of, for example, the extent of overlapping of ink dots formed close to each other on the medium. Furthermore, the graininess can be alleviated while appropriately suppressing the occurrence of concentration unevenness and the like, for example, by performing printing in the printing apparatus 14 (see FIGS. 1A and 1B) based on the post-RIP processing image generated by performing such quantization processing. Thus, for example, printing with higher quality can be appropriately carried out.

Here, in the present example, the operation of subtracting the value corresponding to the dot influence value from the input value obtained by adding the value corresponding to the accumulated error is an example of an adjustment of reflecting the dot influence value on at least either the pixel value of the selected pixel and the threshold. The operation of comparing the input value after adjustment with the threshold is an example of an operation of comparing the pixel value with the threshold using the value after the adjustment of reflecting the dot influence value is carried out. Furthermore, in a modified example of the operation of the image processing apparatus 12, for example, it is also considered to add a value corresponding to the dot influence value with respect to the threshold. It is also conceivable to carry out substantially the same calculation by appropriately inverting the sign of at least one of the pixel value, the threshold, and the dot influence value.

In addition, as described above, in the present example, the quantization is carried out by reflecting the dot influence value indicating how much the position corresponding to the selected pixel is covered by the ink dots formed at the periphery of the selected pixel on the input value (pixel value). Such an operation can be considered as, for example, a method of directly feeding back the influence of dots formed at the periphery.

Figure 4A:
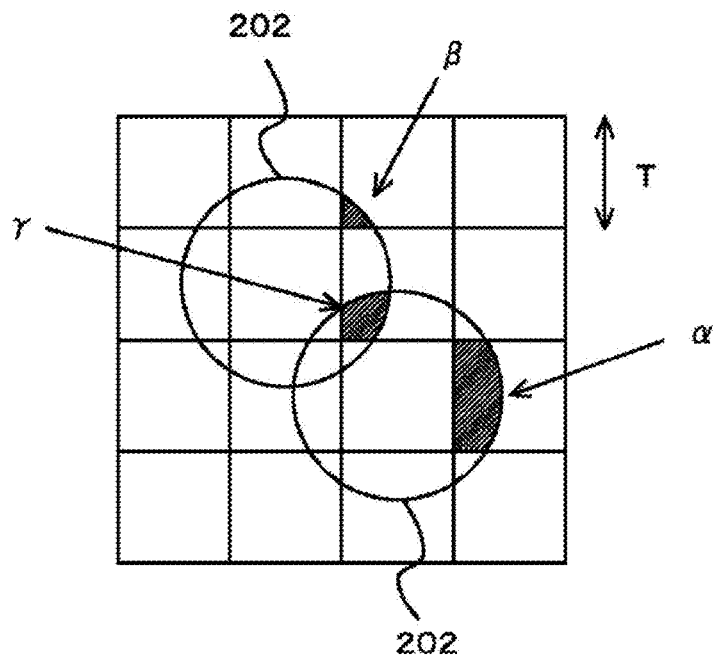
FIGS. 4A and 4B are views showing an example of a dot model used in a reference example.
Figure 4B:
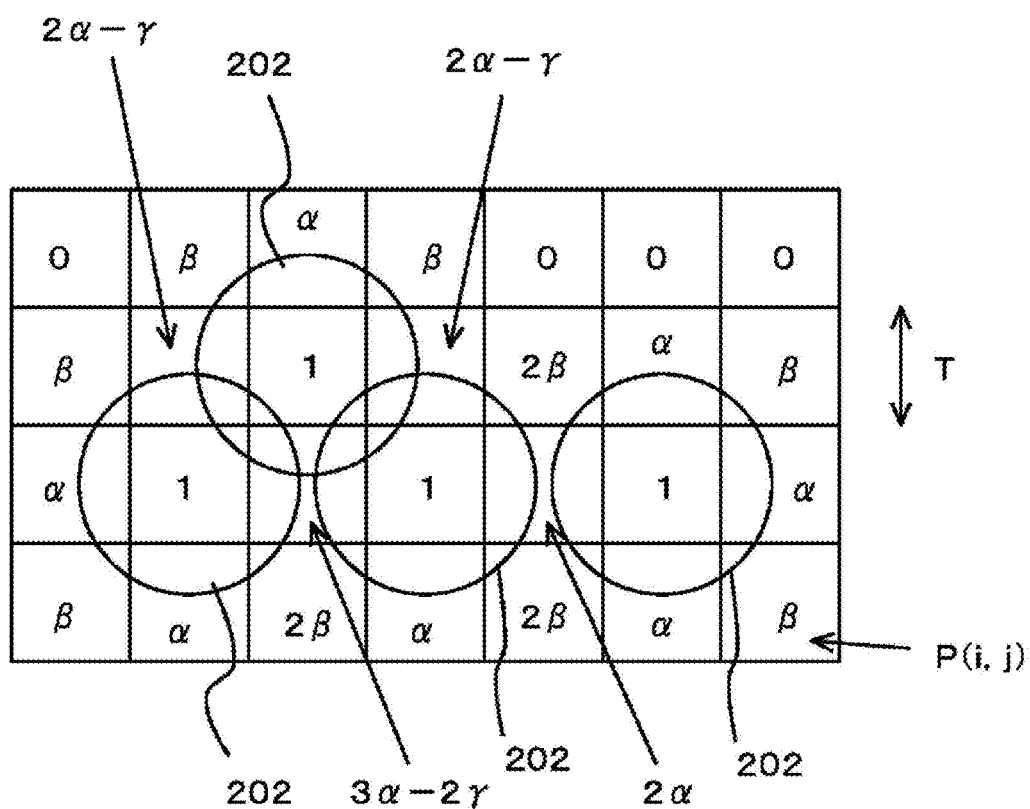

On the other hand, as a way of using the dot model, for example, as shown in FIG. 3B and FIGS. 4A and 4B, it is conceivable to reflect the dot model at the time of calculating the quantization error. FIG. 3B shows an example of how to reflect the dot model in a method different from the present example. For the sake of convenience of explanation, a configuration in which quantization is performed in a manner same as or similar to the operation shown in FIG. 3A is referred to as present example. The configuration for performing quantization with the operation shown in FIG. 3B is referred to as a reference example. FIGS. 4A and 4B shows an example of a dot model used in the reference example. FIGS. 4A and 4B are views describing a protrusion amount of dots considered in the dot model of the reference example.

In the reference example, in relation to the ink dot 202 and the position of the pixel where the dot 202 is formed, for example, parameters corresponding to areas indicated by denoting reference symbols α, β, and γ with a hatched pattern in FIG. 4A are set. Furthermore, the protrusion amount (influence amount) of the dot 202 is calculated using these parameters, for example, as shown in FIG. 4B. In the operation quantization, as shown in FIG. 3B, the quantization error is calculated by reflecting the protrusion amount. In this case, the quantization processing using the dot model can be performed by using the quantization error reflecting the protrusion amount.

However, when the dot model is used as in the reference example, a method of diffusing the quantization error reflecting the dot model is employed, so the effect of using the dot model is also diffused together with the quantization error and hence it will take time until the feedback effect occurs. More specifically, in this case, for example, the influence of the ink dot 202 formed in the adjacent pixel does not appear directly, and it can be considered that a delay occurs. Therefore, when the dot model is used in the method of the reference example, the influence of overlapping of ink dots formed close to each other may not be sufficiently reduced. As a result, it is conceivable that the occurrence of concentration unevenness cannot be appropriately prevented.

On the other hand, as described above with reference to FIG. 3A and the like, in the present example, the dot influence value is not diffused like the quantization error but is directly reflected on the input value. Therefore, according to the present example, the quantization using the dot model can be more appropriately carried out while appropriately preventing feedback delay and the like. Thus, for example, the influence of overlapping of ink dots formed close to each other can be appropriately reduced and the occurrence of concentration unevenness and the like can be appropriately prevented. The operation of the present example can be considered as, for example, an operation in which a feedback destination using a dot model is an input value instead of a quantization error.

Figure 5:
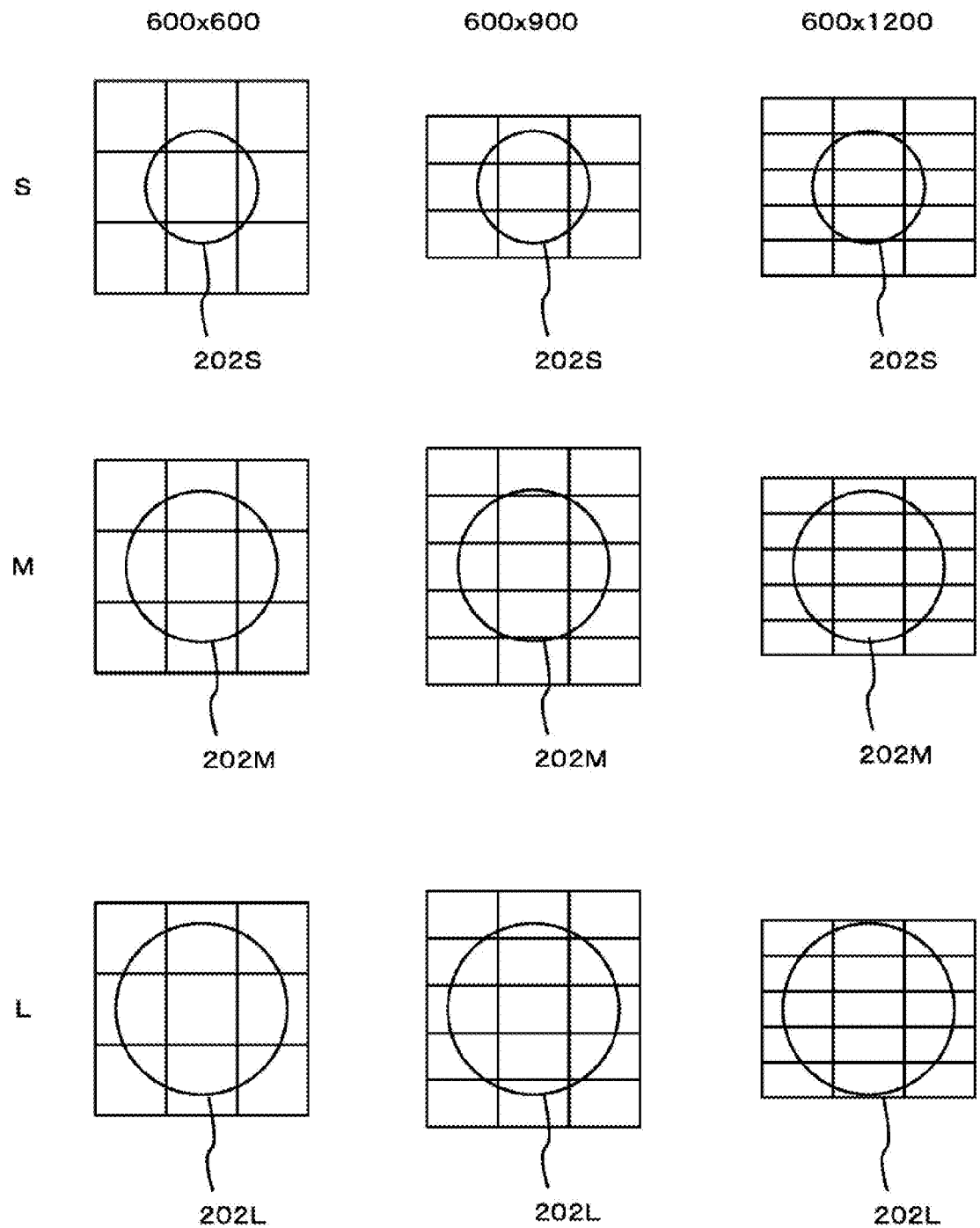
FIG. 5 is a view describing the dot model used in the present example in more detail.

Next, the quantization processing carried out in the present example will be described in more detail. FIG. 5 is a view describing the dot model used in the present example in more detail, and shows one example of a result of simulating a state in which the ink dot to be formed at the position of one pixel is formed protruding out from the position of the relevant pixel at the time of printing. As described above, the printing apparatus 14 (see FIGS. 1A and 1B) of the present example uses an inkjet head capable of forming ink dots of a plurality of sizes as the inkjet head for each color. In this case, a model for each size of the ink dot is used as the dot model. More specifically, in the present example, the largest L size (Large size) dot 202L, the second largest M size (Middle size) dot 202M, and the smallest S size (Small size) dot 202S are used for the ink dots of a plurality of sizes. In this case, the process of determining the size of the ink dot formed at one position can be considered as a four-gradation process including a case where no dot is formed.

Furthermore, as described above, in the present example, a model indicating how much one ink dot formed at the position of one pixel in the resolution covers the position of the peripheral pixel is used as the dot model. Therefore, a model for every printing resolution is used as the dot model. More specifically, in FIG. 5, an example of a relationship between the ink dot of each size of L, M, and S and the printing resolution is shown for three types of resolutions of 600×600 dpi, 600×900 dpi, and 600×1200 dpi, as the dot model. In the drawing, the square shown together with the dots of the respective sizes indicates the position of the pixel determined according to the printing resolution. In this case, the line surrounding the square can be considered as, for example, a pixel boundary line, and the like.

In the present example, as the dot model corresponding to the respective size and resolution, a parameter indicating how much of the squares corresponding to each pixel at the periphery of the pixel where the ink dot is formed is covered by the ink dot is used. The parameter indicating how much the square is covered by the ink dots is, for example, a parameter proportional to the area covered by the ink dots in the square. In this case, the dot model can be considered as, for example, a parameter set according to the diameter (dot diameter) of the ink dot and the resolution. Furthermore, the parameter configuring the dot model can be considered as, for example, a value indicating the amount of influence on the periphery, and the like. For example, a range in which overlapping of dots is considered between adjacent ink dots can be appropriately set by using such dot model. Moreover, by using a model for each dot size, for example, even when dots of different sizes are used, the quantization processing can be appropriately performed in consideration of the arrangement of dots of each size.

As such a parameter, it is conceivable to use a value obtained by performing adjustment such as normalization at a predetermined standard instead of a value equal to the area in which the square is covered. More specifically, as described above, in the present example, subtraction is performed by subtracting a value corresponding to the dot influence value from an input value obtained by adding a value corresponding to the accumulated error. In this case, the parameter used as the dot model is preferably set so that, for example, the maximum value of the pixel value (input concentration) used as the input value does not exceed the dot influence value. For example, when the maximum value of the input concentration is 100%, the parameter is preferably set so that the dot influence value does not exceed 100% even if the ink dot is formed at the positions of all the pixels at the periphery of the selected pixel.

More specifically, in the present example, as the parameter configuring the dot model, for example, a value calculating the proportion of the ink dot formed at the position of one pixel covering the position of each peripheral pixel (proportion of the dots of each pixel) is used. In this case, a value corresponding to the proportion of dots of each pixel is set so that the sum is a predetermined value (e.g., 1) with respect to the pixels forming the ink dots and the peripheral pixels. According to such a configuration, for example, the parameter configuring the dot model can be set appropriately.

The dot influence value used in the present example will be described in more detail. As described above, in the present example, quantization processing is performed using the dot influence value calculated based on the dot model. Furthermore, as the dot influence value, for example, a value indicating how much the position corresponding to the selected pixel is covered by the ink dot formed at the periphery of the pixel (selected pixel) selected as the quantization target is calculated. In this case, the ink dots formed at the periphery are ink dots formed at the positions of pixels where quantization has already been completed at the periphery of the selected pixel.

With this configuration, for example, the quantization performed on the respective selected pixel can be performed in consideration of only the influence of the ink dots corresponding to the pixels where quantization has been completed by that time point. More specifically, in this case, the image processing apparatus 12 (see FIGS. 1A and 1B), for example, calculates, as the dot influence value to be used in the quantization on the selected pixel, a value indicating how much the position corresponding to the selected pixel is covered by the ink dot formed at the position corresponding to the pixel where quantization has already been completed before the quantization on the selected pixel is performed. According to such a configuration, for example, the quantization processing, in which the dot influence value is taken into consideration, can be appropriately performed without repeating the scanning for selecting the pixel over a plurality of times. The dot influence value can also be considered as, for example, the sum of the influences of the ink dots formed at the peripheral pixels of the selected pixel on the position of the selected pixel. The sum of the influences of the ink dots formed at the peripheral pixels on the position of the selected pixel is, for example, a value obtained by adding a value corresponding to a positional relationship between the peripheral pixel and the selected pixel among the values of the parameters set to the position of each pixel in the dot model.

In the present example, for example, the image processing apparatus 12 performs only one quantization with respect to each pixel of the input image in the quantization operation corresponding to one type of ink. Performing only one quantization means, for example, performing scanning (scanning) of sequentially selecting a pixel as a selected pixel so that each pixel is selected only once. According to such configuration, for example, the quantization processing can be performed at higher speed compared with a case where the scanning for selecting a pixel is repeated over a plurality of times. Furthermore, performing only one quantization can also be considered as, for example, performing scanning of selecting a pixel only once without repeatedly performing scanning with respect to the entire image. Therefore, for example, it is conceivable to perform quantization over a plurality of times if for only some exceptional pixels.

Figure 6A:
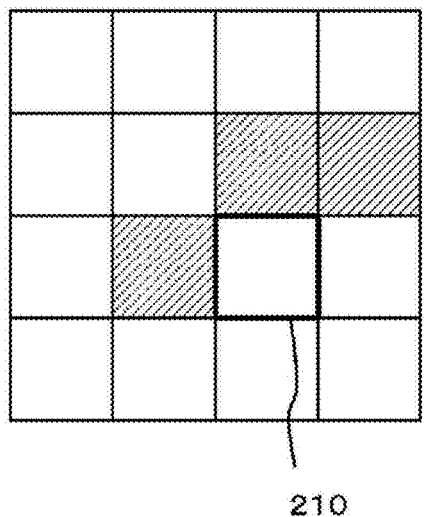
FIGS. 6A and 6B are views describing the effect obtained by the quantization processing performed in the present example.
Figure 6A:
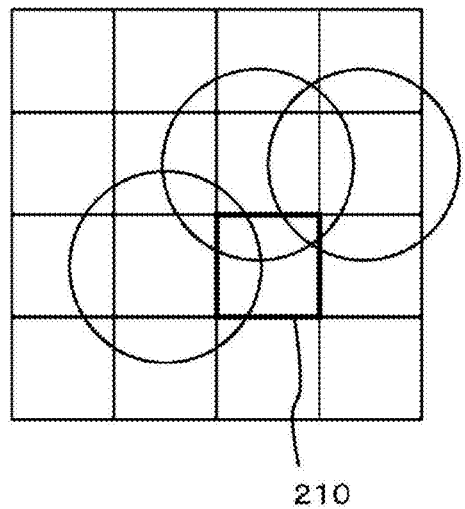
Figure 6B:
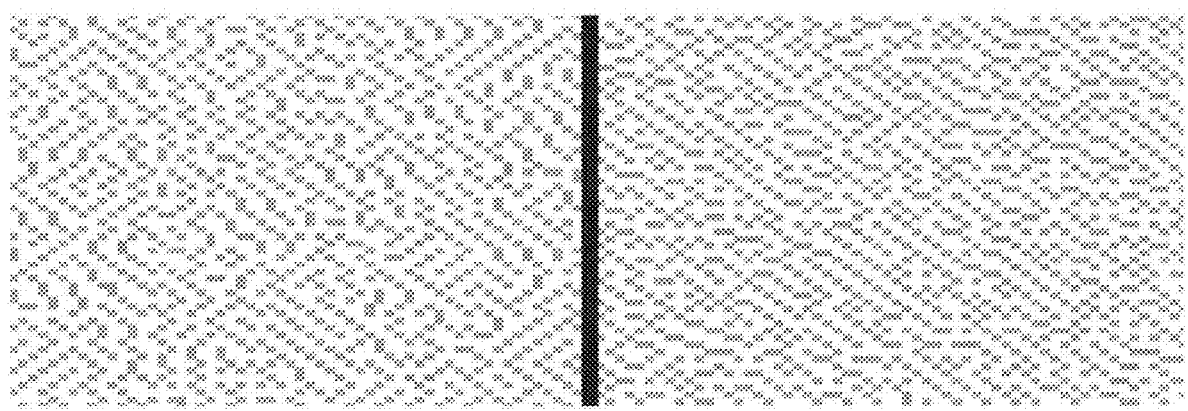

FIGS. 6A and 6B are views describing the effect obtained by the quantization processing performed in the present example. FIG. 6A is a view showing an example of the effect obtained by using the dot model, and shows a comparison between pixel processing in which quantization processing is performed without using the dot model and dot model processing in which quantization processing is performed using the dot model. In the drawing, the view on the left side shows one example of an operation in the pixel processing. The view on the right side shows one example of an operation in the dot model processing. In the drawing, the square surrounded by a thick line indicates the position of the selected pixel 210.

In the case shown in the drawing, it is already determined that a plurality of ink dots will be formed at the positions of the peripheral pixels of the selected pixel 210. In such a case, in the pixel processing, the arrangement of the peripheral dots are not taken into consideration, and thus even if the position of the selected pixel 210 is already sufficiently covered by other peripheral ink dots, there is a possibility that a new dot will be arranged at the position of the selected pixel 210. On the other hand, in the dot model processing, the protrusion amount from the ink dot at the position of the peripheral pixel can be taken into consideration by using the dot model. More specifically, in this case, for example, a plurality of dots are prevented from being arranged excessively close by applying the sum of the protrusion amounts from each peripheral pixel in negative feedback with respect to the input value (input concentration) of the selected pixel 210. Furthermore, for example, when the position of the selected pixel 210 is already sufficiently covered by other ink dots, a new dot can be appropriately prevented from being arranged at the position of the selected pixel 210. Therefore, according to the present example, for example, as described above, the occurrence of concentration unevenness and the like can be appropriately suppressed and graininess can be alleviated.

When performing the dot model processing, for example, it is possible to consider the ratio of the printing resolution and the dot size in each direction. More specifically, for example, when performing the dot model processing, the arrangement of ink dots that matches the condition of resolution can be more appropriately realized between a case where printing is performed at an equal ratio resolution in which the resolutions in the predetermined X direction and Y direction set in the printing apparatus are equal, and a case where printing is performed at a different ratio resolution in which the resolution in the X direction and the resolution in the Y direction are different.

FIG. 6B is a view showing a comparison between an arrangement of dots in the case of the equal ratio resolution and an arrangement of dots in the case of the different ratio resolution, and shows one example of a result of printing when the dot model processing is used. A plurality of points arranged in the drawing indicate a plurality of ink dots formed on the medium in an enlarged manner. Furthermore, in the drawing, the view on the left side shows one example of a result of performing printing at an equal ratio resolution of 600×600 dpi. The view on the right side shows one example of a result of performing printing at a different ratio resolution of 600×900 dpi.

When performing printing at a different ratio resolution, it is generally considered that dots are easily connected in a direction of resolution in which the dot interval becomes shorter. For example, when performing printing at a resolution of 600×900 dpi, dot connection is likely to occur in the vertical direction (Y direction). In this case, when quantization is performed without using the dot model, a difference may occur in how the dots are connected between the vertical direction and the horizontal direction (X direction), which may affect the printing result. On the other hand, when the dot model is used, quantization is performed by reflecting the relationship between the resolution and the dot diameter in each direction. Furthermore, for example, in the case of different ratio resolution, quantization can be performed in consideration of the difference in dot interval by direction. More specifically, in this case, for example, as shown in the drawing, the ink dots are easily connected in the horizontal direction, so that the dispersibility of the printing result can be maintained high in each of the vertical and horizontal directions. Furthermore, in this case, as shown in the drawing, even when performing printing at the equal ratio resolution, the dispersibility of the printing result can be maintained high in each of the vertical and horizontal directions. According to the present disclosure, for example, printing with high quality can be appropriately carried out.

Next, the quantization processing in a case where ink dots of a plurality of sizes are used will be described in more detail. As described above, in the present example, the printing apparatus 14 (see FIGS. 1A and 1B) uses an inkjet head capable of forming ink dots of a plurality of sizes. A model for each size of the ink dot is used for the dot model. Furthermore, the image processing apparatus 12 (see FIGS. 1A and 1B) performs the quantization operation for each size of the ink dot to generate a post-quantization image (generated image) indicating the position to form the ink dot of each size. In this case, performing the quantization operation for each dot size means performing, for every size, the quantization operation for determining the position to form the dot of each size. Furthermore, in the quantization operation corresponding to each size, the quantization is performed by the operation shown in FIG. 3A, for example, using the dot model corresponding to the relevant size. In this case, the post-quantization image can be considered as, for example, an image including a result of processing corresponding to the respective size. In addition, the post-quantization image may be an image composed of a plurality of images including a result of processing corresponding to the respective size.

Furthermore, when printing is performed using dots of a plurality of sizes, normally, the larger the size of the dots, the more noticeable. Therefore, for example, it is preferable to appropriately consider the arrangement of the largest size dots in order to suppress the graininess in the printing result. Therefore, in the present example, the quantization operation performed for each size of the ink dot is performed in order from the quantization operation corresponding to the large size. According to this configuration, for example, printing with higher quality can be appropriately performed by preferentially determining the positions of large ink dots that have a large influence on graininess and the like.

Furthermore, when the quantization operation corresponding to the large size is performed in order, the quantization is performed in a state where the arrangement of the larger size dots has already been determined at the time of the quantization operation corresponding to the size other than the largest size. In this case, the pixel position of the selected pixel 210 may be already covered with a dot of a larger size. Therefore, the present example further considers the arrangement of larger size dots in the quantization operation corresponding to each size. According to such a configuration, for example, the quantization that takes into consideration dots formed at the periphery can be more appropriately performed.

Figure 7A:
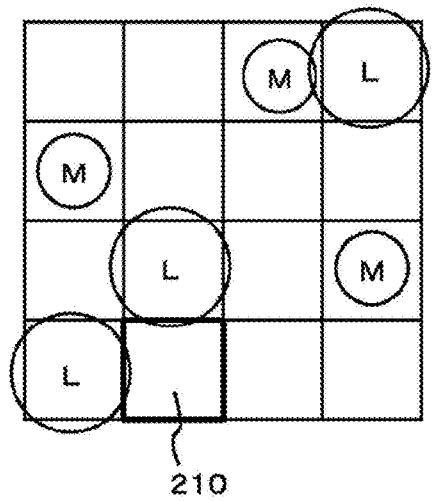
FIGS. 7A to 7C are views describing in more detail the quantization operation performed for each dot size.
Figure 7B:
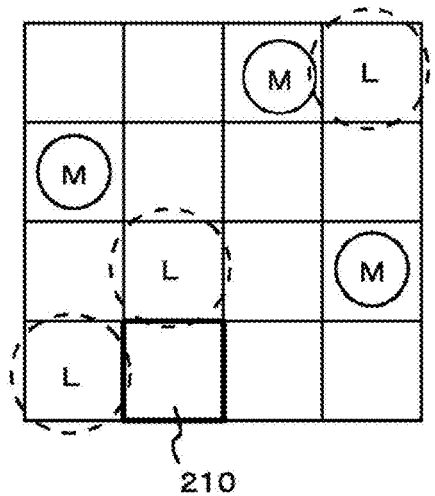
Figure 7C:
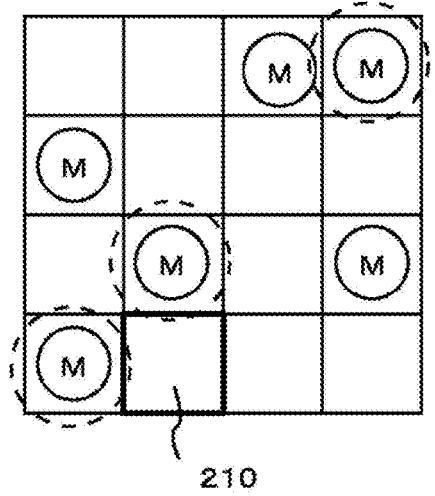

FIGS. 7A to 7C are views describing in more detail the quantization operation performed for each dot size, and shows one example of the quantization operation corresponding to the M size for a case where three types of dots, L size, M size, and S size are formed. FIG. 7A is a view showing one example of the selected pixel 210 to be selected in the quantization operation corresponding to the M size, and shows the position of the selected pixel 210 together with the ink dot which arrangement is already determined before the selection of the selected pixel 210.

In the drawing, a circle with the letter L indicates an L size dot (L dot). A circle with the letter M indicates an M size dot (M dot). For the sake of convenience of illustration, in FIGS. 7A to 7C, L dots and M dots are shown slightly smaller than the squares indicating the positions corresponding to the respective pixels. FIGS. 7A to 7C show an example in which L dots are arranged at a proportion (output proportion) of 18% and M dots are arranged at a proportion of 25%. Furthermore, in this case, the dots are arranged at a proportion of 43% in the total of L dots and M dots.

FIG. 7B is a view showing an example of a quantization operation corresponding to the M size (quantization operation for M dot) performed through a method different from the present example, and shows one example of an operation when quantization for M dots is carried out without taking into consideration the arrangement of L dots having a larger size. In this case, in the quantization for M dots, quantization is performed so that the proportion of M dots becomes 25% without taking into consideration the L dots indicated by a broken line in the drawing. Even in such a configuration, for example, the dispersibility can be appropriately increased for the ink dot of each size. However, the dispersibility considered by combining dots of different sizes is not necessarily high. In this case, as the presence of L dots is not taken into consideration, the M dots can be easily arranged even at positions close to the L dots. As a result, the overlap between the L dot and the M dot is increased, and thus concentration unevenness or the like is likely to occur. Furthermore, when a dot model is used in combination with the dither method and the like as in the present example, if the quantization operation corresponding to each size is performed without taking into consideration dots of a larger size, deviation in dispersibility in the dither characteristics may occur. As a result, dots in which deviation in dispersibility is large become noticeable, which may become the cause of graininess, and the like.

On the other hand, in the present example, as described above, the arrangement of dots of a larger size is further considered in the quantization operation corresponding to each size. FIG. 7C shows one example of the quantization operation for M dots performed in the present example. As shown in the drawing, in the present example, in the quantization for M dots, the position where the L dot is arranged is handled as the position where the M dot is arranged by replacing the L dot with the M dot. In this case, the amount of L dots replaced with M dots is added for the proportion of dots to be arranged. More specifically, as described above, when the L dots are arranged at a proportion of 18% and the M dots are arranged at a proportion of 25%, in the quantization operation for M dots, the quantization is performed to arrange the dots at a proportion of 43% obtained by adding 18% and 25%. According to such a configuration, for example, the quantization operation performed by replacing the L dot with the M dot can be appropriately performed. Furthermore, such an operation can be considered as, for example, a processing for determining whether or not an M dot can be arranged at the position of the selected pixel 210 in FIG. 7C. Moreover, in this case, the operation of the image processing apparatus 12 (see FIGS. 1A and 1B) in the quantization operation corresponding to each size can be considered as, for example, an operation of handling the position, where it is determined that an ink dot of a larger size will be formed, as being formed with an ink dot of a size being processed.

According to the present example, for example, by determining the position of the dot of each size reflecting the arrangement of a dot of a larger size, the dispersibility of the dots can be appropriately enhanced and the arrangement of dots of each size can be determined including a region surrounded by the ink dots of a larger size. Furthermore, in this case, since high dispersibility can be maintained in the result of quantization combining all sizes, the overlap between dots can be reduced more appropriately. Thereby, for example, the occurrence of concentration unevenness can be prevented more appropriately. Furthermore, in this case, the deviation in dispersibility in the dither characteristic can be more appropriately prevented from occurring by giving the relevance to the manner of arranging dots between different sizes.

As described above, in the present example, the arrangement of dots of a larger size is being considered by replacing the ink dots of a larger size with the dots of a size being processed, like the L dots being replaced with the M dots in the operation shown in FIG. 7C. In this regard, if the arrangement of dots of a larger size is taken into consideration, it may appear that the dot of a larger size can be handled in the actual size without replacing it with a dot of a size being processed. However, in this case, for example, the processing becomes complex and the processing speed may greatly reduce. On the other hand, according to the present example, for example, the quantization operation that takes into consideration the influence of larger ink dots can be appropriately performed while appropriately suppressing the complexity of the processing.

In addition, as described above, in the present example, the quantization processing is performed by further using the error diffusion characteristics. In this case, the operation of the present example can be considered as, for example, an operation of associating processing with respect to each size in the variable dots and sharing an error between the dot sizes. By performing the quantization processing in this manner, the ink dots can be more appropriately prevented from standing out due to, for example, concentration unevenness and the like.

Figure 8A:
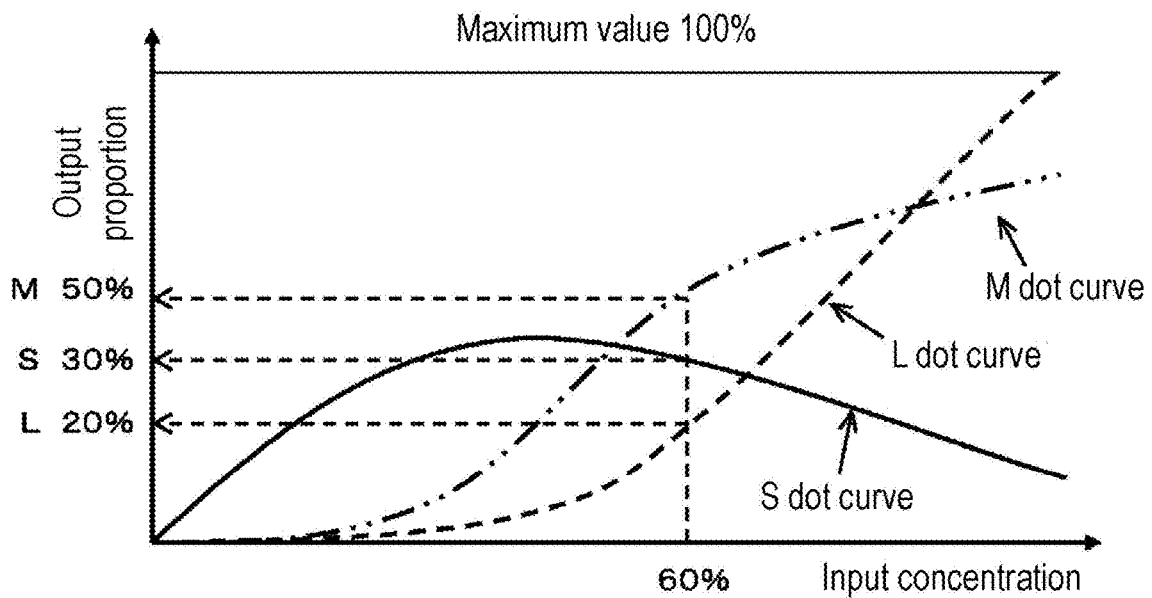
FIGS. 8A and 8B are views describing the manner of determining the proportion (output proportion) of arranging the dots of each size in the quantization operation performed for each dot size.
Figure 8B:
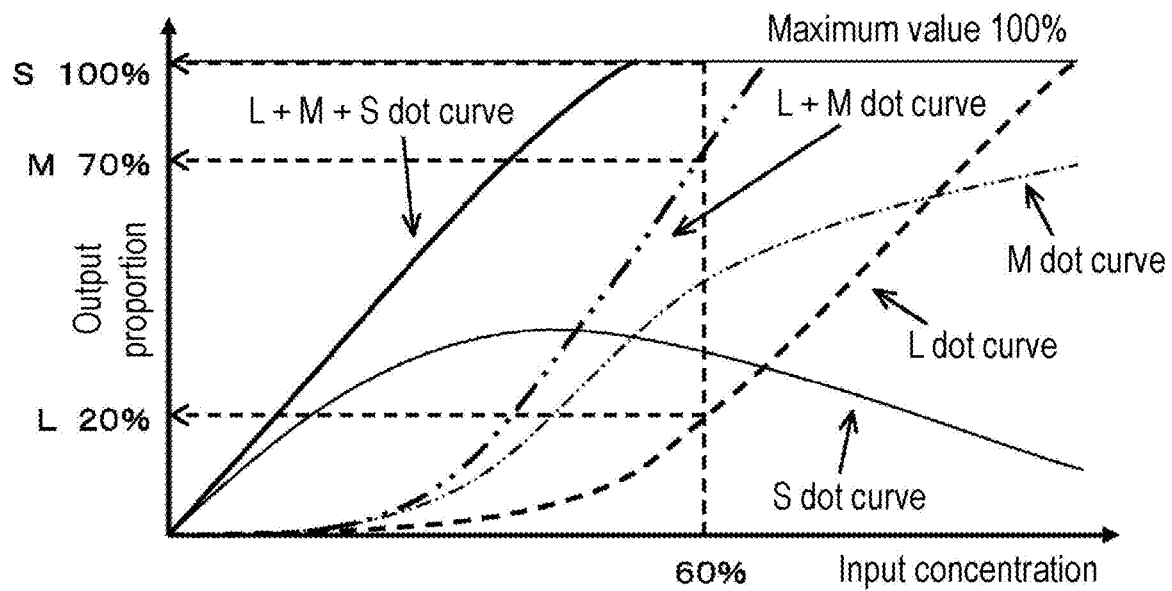
Figure 9:
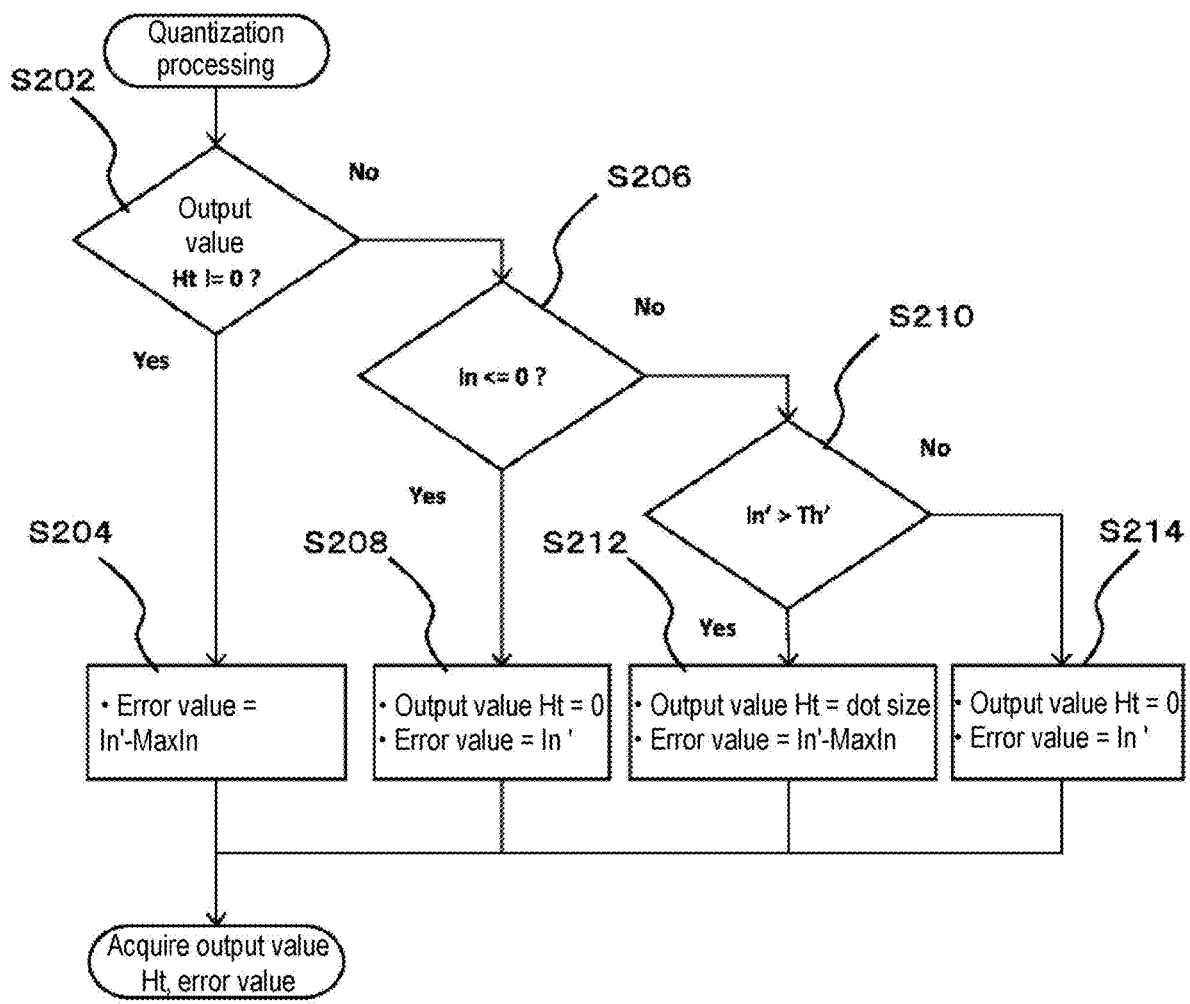
FIG. 9 is a view showing one example of the manner of setting the quantization error in the present example.

FIGS. 8A, 8B, and 9 are views describing in further detail the quantization operation performed for each dot size. FIGS. 8A and 8B is a view describing the manner of determining the proportion (output proportion) of arranging the dots of each size. FIG. 8A shows one example of the manner of determining the output proportion of the dots of each size for a case where quantization for each size is performed without considering the arrangement of dots of a larger size. In this case, as shown in the drawing, for each size, data indicating a relationship in which the value changes according to the input concentration, which becomes the input value, is prepared in advance for each size. More specifically, in this case, for example, as shown in the drawing, as a curve indicating the relationship between the input concentration and the output proportion corresponding to each size, an L dot curve corresponding to L dots, an M dot curve corresponding to M dots, and an S dot curve corresponding to S dots are prepared in advance, and the output proportion of each dot is determined according to these curves. In this case, for example, a relative value with the maximum input concentration as 100% is used for the input concentration. More specifically, in a case where each curve as shown in the drawing is used, if the input concentration of the selected pixel is 60%, the output proportion of S dots is 30% and the output proportion of M dots is 50%, and the output proportion of L dots is 20%.

On the other hand, in the present example, the output proportion is determined so that quantization with respect to each size can be performed in consideration of the arrangement of dots of a larger size by, for example, determining the output proportion as shown in FIG. 8B. FIG. 8B shows one example of the manner of determining the output proportion in the present example. As described above, in the present example, in the quantization for M dots, the position where the L dot is arranged is handled as the position where the M dot is arranged by replacing the L dot with the M dot. In this case, in the quantization for S dots, the position where the L dot or the M dot is arranged is similarly handled as the position where the S dot is arranged by replacing the L dot and the M dot, which are dots larger than the S dot, with the S dot.

In this case, in the quantization for L dots, the output proportion of the L dots is determined using the L dot curve, similarly to the case described with reference to FIG. 8A. Then, in the quantization for M dots, the output proportion combining the L dots and the M dots is determined using an L+M dot curve shown in the drawing instead of the M dot curve. Furthermore, in the L+M dot curve, as a value corresponding to the input concentration, a value obtained by adding a value in the L dot curve and a value in the M dot curve is used. In this case, as the M dot curve, a curve same as the M dot curve in FIG. 8A is used, as shown by a thin line in FIG. 8B. In the quantization for S dots, the output proportion combining the L dots, the M dots and the S dots is determined using an L+M+S dot curve shown in the drawing instead of the S dot curve. In the L+M+S dot curve, as a value corresponding to the input concentration, a value obtained by adding a value in the L dot curve, a value in the M dot curve, and a value in the S dot curve is used. In this case, as the S dot curve, a curve same as the S dot curve in FIG. 8A is used, as shown by a thin line in FIG. 8B. The set of curves shown in FIG. 8B (e.g., set consisting of L dot curve, L+M dot curve, and L+M+S dot curve) can be considered as, for example, a VD curve associating the output proportion of dots of a plurality of sizes and the input value (input concentration), and the like. Furthermore, the VD curve can be considered as, for example, a curve corresponding to a table in which the filling proportion of dots of each size per unit area is determined with respect to the input value.

More specifically, for example, in a case where each curve as shown in FIG. 8B is used, if the input concentration of the selected pixel is 60%, the output proportion used at the time of quantization for L dots becomes 20%, similar to a case where the curve of FIG. 8A is used. Furthermore, the output proportion used at the time of quantization for M dots becomes 70%, which is obtained by adding 20% for L dots and 50% for M dots. Moreover, the output proportion used at the time of quantization for S dots becomes 100%, which is obtained by adding 20% for L dots, 50% for M dots, and 30% for S dots. According to such a configuration, for example, the output proportion can be appropriately set when performing quantization for each size in consideration of the arrangement of dots of a larger size.

In addition, when performing the quantization processing as described above, it is conceivable to partially differ the manner of calculating the quantization error from, for example, a case where quantization with respect to each size is performed without considering the arrangement of dots of a larger size. More specifically, for example, in a case where quantization on a dot of any size is performed, assuming a dot having a size larger than the size being processed is defined as an upper dot and a dot having a smaller size is defined as a lower dot, the processing of calculating the quantization error needs to be differed for a case where there is an output value (set to a value other than zero) as the upper dot is already arranged. More specifically, for example, in the quantization performed for each size without considering the arrangement of the upper dots, the dot of a size being processed needs to be prevented from being newly arranged in a case where the upper dots are already arranged at the position of the selected pixel. In this case, since a new dot cannot be arranged, the input value becomes the quantization error as it is.

On the other hand, in the quantization performed for each size in consideration of the arrangement of the upper dots, the processing may be performed assuming new dots are arranged, although new dots are not actually arranged, by reflecting the arrangement of the upper dots in the quantization operation on the size being processed. In regards to this, for example, it can be considered that by performing such processing, the arrangement of upper dots can be reflected in the quantization operation on the size being processed. In this case, a quantization error for the upper dot additionally occurs at the position of the dot of the size being processed. Therefore, in this case, for example, it is necessary to add a quantization error for the upper dots with respect to the input concentration. As a result, it becomes necessary to make the operation for setting the quantization error partially different from a case where the arrangement of upper dots is not taken into consideration.

FIG. 9 is a view showing one example of the manner of setting the quantization error in the present example, and shows one example of an operation for setting the output value and the error value based on the result of the quantization with respect to the selected pixel. In the present example, in the quantization operation performed on one selected pixel, first, whether or not the output value Ht is set to a value other than 0 is confirmed (S202). In this case, for example, if the upper dot is already arranged at the position of the selected pixel, the output value is set to a value other than 0. When the output value Ht is set to a value other than 0 (S202: Yes), a value (In'-MaxIn) obtained by subtracting a maximum input value MaxIn from the error-corrected input value In' is set as the error value indicating the quantization error (S204). The quantization operation with respect to the relevant selected pixel is thereby finished. In this case, the error-corrected input value In' is an input value that reflects the accumulated error. The maximum input value MaxIn is the maximum value that can be taken as an input value.

When quantization is performed on each size in consideration of the arrangement of upper dots, an error value is calculated individually for each size. In this case, a value equal to the error-corrected input value In' is set in correspondence with the fact that a new dot is not arranged for the error value when the output value Ht is set to a value other than 0. Therefore, as described above, the error value in a case where there is an output value varies as the upper dots are already arranged in accordance with the difference in whether or not the arrangement of upper dots is taken into consideration.

When determined in step S202 that the output value Ht is set to 0 (S202: No), whether or not the input value is less than or equal to 0 is further confirmed (S206). When the input value is less than or equal to 0 (S206: Yes), the output value Ht is set to 0, and the error value is set to a value equal to the error-corrected input value In' (S208), and the quantization operation with respect to the relevant selected pixel is finished. When the input value is 0, the output value Ht is preferably always 0. However, when the quantization is performed by reflecting the accumulated error, the output value Ht may be set to a value other than 0 due to the influence of the accumulated error. On the other hand, as described above, the output value Ht can always be set to 0 when the input value is 0 by separately preparing a processing for when the input value is less than or equal to 0.

Furthermore, when determined in step S206 that the input value is greater than 0 (S206: No), the error-corrected input value In' is compared with the noise-corrected threshold Th' (S210). In this case, the noise-corrected threshold Th' is a threshold that reflects the dither matrix noise. When determined that the error-corrected input value In' is greater than the noise-corrected threshold Th' (S210: Yes), the output value Ht is set to a value corresponding to the dot size, the error value is set to a value (In'-MaxIn) obtained by subtracting the maximum input value MaxIn from the error-corrected input value In' (S212), and the quantization operation with respect to the selected pixel is finished. In this case, the value corresponding to the dot size is, for example, a value set in advance with respect to the dot of each size. It is conceivable that for a value corresponding to the dot size, for example, a value corresponding to a larger size uses a larger value. More specifically, in the present example, 3 is used as a value corresponding to L dots, 2 is used as a value corresponding to M dots, and 1 is used as a value corresponding to S dots. Furthermore, in this case, as can be understood from the above description and the like, 0 is used as the output value Ht indicating that dots are not formed. In step S210, when determined that the error-corrected input value In' is less than or equal to the noise-corrected threshold Th' (S210: No), the output value Ht is set to 0, the error value is set to a value equal to the error-corrected input value In' (S214), and the quantization operation for the relevant selected pixel is finished.

As described above with reference to FIGS. 3A and 3B and the like, in the present example, quantization is performed by reflecting the dot influence value calculated based on the dot model. In this case, for example, in step S210, a parameter based on the dot influence value may be further used to reflect the dot influence value, and the error-corrected input value In' may be compared with the noise-corrected threshold Th'. In this case, the comparison between the error-corrected input value In' and the noise-corrected threshold Th' performed in step S210 may not be simply correcting the error-corrected input value In' and the noise-corrected threshold Th' as shown in a simplified manner in the drawing, and may be comparing a value in which adjustment is made based on a parameter based on the dot influence value with respect to the error-corrected input value In' and the noise-corrected threshold Th', and the like. In this case, when the error-corrected input value In' is larger than the noise-corrected threshold Th', this means that for example, the value in which such adjustment is made larger than the noise-corrected threshold Th'. Furthermore, when the error-corrected input value In' is less than or equal to the noise-corrected threshold Th', that means that, for example, the value in which such adjustment is made is less than or equal to the noise-corrected threshold Th'. The comparison operation performed in step S210 will be described in more detail later.

According to the present example, for example, in the quantization operation for each pixel, the output value and the error value can be appropriately set. In this case, the calculated error value is diffused to the periphery based on, for example, an error diffusion filter. According to such a configuration, for example, the quantization processing that reflects the quantization error can be appropriately performed.

Figure 10A:
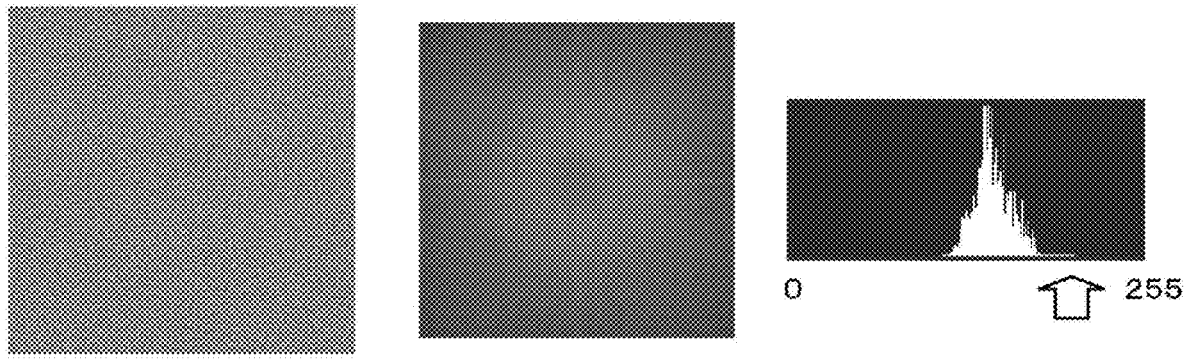
FIGS. 10A to 10C are views showing one example of a result of quantization processing.
Figure 10B:
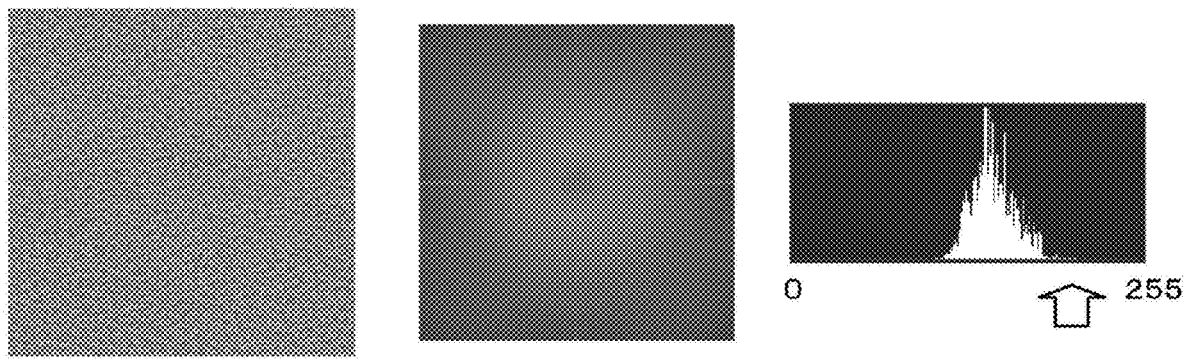
Figure 10C:
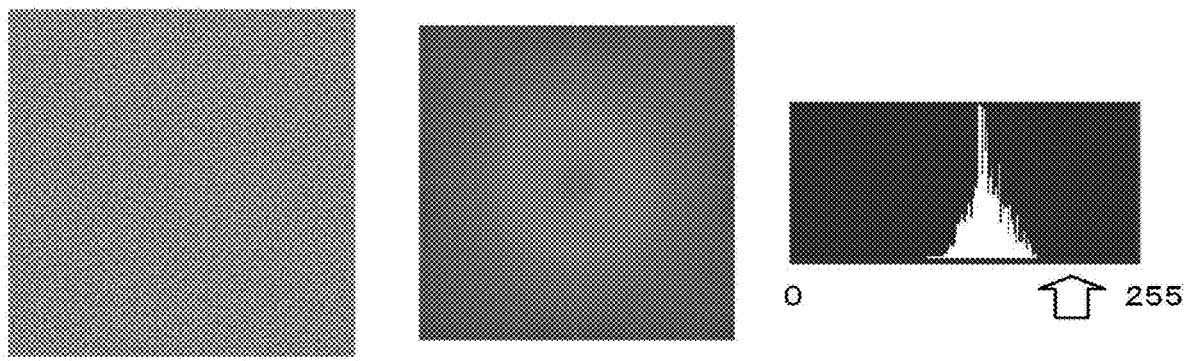

FIGS. 10A to 10C are views showing one example of the result of the quantization processing, and shows a comparison between the result of performing the quantization through the method of the present example and the result of performing the quantization through another method. FIGS.

10A and 10B show one example of the result of performing quantization through a method different from the method of the present example. FIG. 10C shows one example of the result of performing quantization through the method of the present example. In this case, the result of performing the quantization through the method of the present example is the result of performing the quantization through the method described with reference to FIG. 3A. As another method, the dither processing described with reference to FIG. 2A and the hybrid processing described with reference to FIG. 2C were used. FIG. 10A shows one example of the result of the dither processing. FIG. 10B shows one example of the result of the hybrid processing. As a result of the quantization, the result of performing binarization by simulation (simulation result) is shown. In each of FIGS. 10A to 10C, the view on the left side shows the simulation result. The view in the middle shows the result (spatial frequency distribution) of calculating the spatial frequency with respect to the simulation result. Furthermore, the view on the right side shows a histogram of luminance in the simulation result.

From the simulation result, it can be seen that, for example, the graininess is alleviated by the method of the present example as compared with the case where the hybrid processing is performed. Furthermore, from the spatial frequency, for example, the dispersibility in the binarization result can be confirmed. In this case, with regard to the spatial frequency, for example, it can be considered that the dispersibility becomes lower toward the center, and the dots are arranged close to each other. As a result, it can be considered that the dots stand out more as they go toward the center. In this case, on the contrary, it can be considered that the dispersibility becomes higher toward the outer side from the center, and the dots are less likely to stand out.

In this regard, both the dither processing and the hybrid processing, which results are shown in FIGS. 10A and 10B, are binarization in which the dispersibility increases. Therefore, the spatial frequency has a distribution characteristic such that the center is black and a white portion spreads at the periphery. This feature is also the same in the method of the present example. However, in the method of the present example, for example, the distribution on the high dispersion side is increased compared to, for example, the dither processing, and a whiter and clearer state is obtained. Compared with the hybrid processing, in the method of the present example, although there is almost no change on the high dispersion side, it can be said that the black circle on the low dispersion side of the center is larger. When these points are taken into consideration, the method of the present example can be considered as, for example, a method of making dots less noticeable. In addition, from the luminance histogram, it can be considered that by performing the quantization through the method of the present example, for example, a portion with high luminance as indicated by an arrow in the drawing has fewer gap portions than other methods, and hence has improved filling. From the above results, it can be seen that high-quality quantization can be appropriately performed according to the present example.

Figure 11:
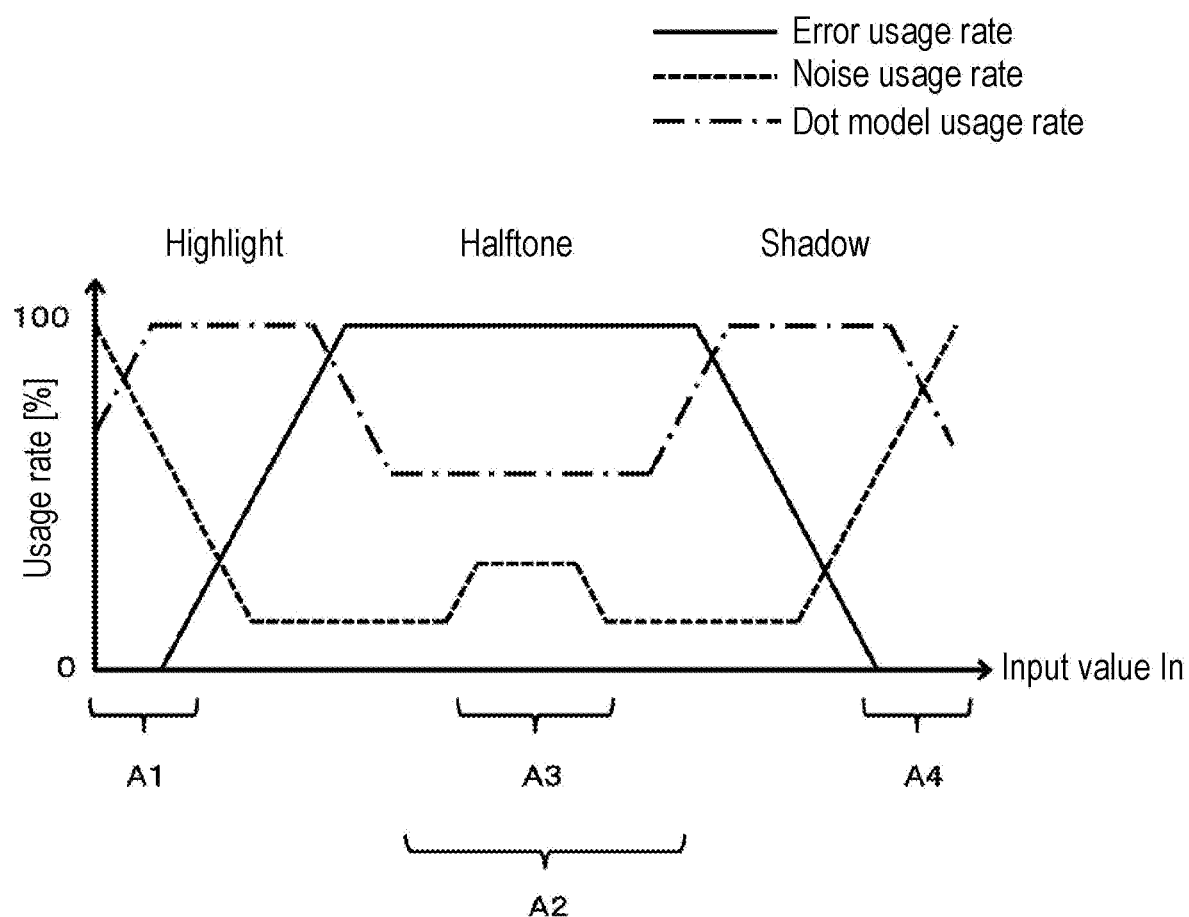
FIG. 11 is a view showing an example of a parameter used in the quantization processing performed in the present example.

Next, the quantization processing performed in the present example will be more specifically described in detail. FIG. 11 is a view showing an example of a parameter used in the quantization processing performed in the present example, and shows an example of a dot model usage rate, a noise usage rate, and an error usage rate described below.

As described above, in the present example, the quantization is performed in consideration of the influence caused by overlapping of adjacent ink dots by performing the quantization using a dot model. Furthermore, in this case, as described above, the influence caused by overlapping of adjacent ink dots is taken into consideration by calculating the dot influence value based on the dot model, and performing the quantization by reflecting the dot calculation value.

However, it is conceivable that the influence caused by the overlapping of adjacent ink dots changes, for example, by the gradation at the position where the dots are formed in the printed image. Therefore, in the present example, the image processing apparatus 12 (see FIGS. 1A and 1B) performs quantization on the selected pixel by reflecting the dot influence value at a proportion that changes according to the pixel value of the selected pixel. According to such a configuration, for example, to what extent to reflect the dot influence value can be changed according to the pixel value of the selected pixel. Thus, for example, quantization corresponding to the gradation of an image can be performed more appropriately.

More specifically, in the present example, a dot model usage rate shown in the drawing is used as a parameter indicating to what extent to reflect the dot influence value. In this case, the operation of the image processing apparatus 12 at the time of quantization processing can be considered, for example, as one example of an operation of performing adjustment based on the dot influence value with respect to at least one of the pixel value of the selected pixel or the threshold by reflecting the dot influence value based on the dot model usage rate. Furthermore, in the present example, the dot model usage rate is one example of a dot influence value usage rate indicating a proportion at which to reflect the dot influence value in the quantization operation for the selected pixel. As shown in the drawing, it is conceivable to use a positive coefficient that changes according to the input value as the dot model usage rate. In this case, the dot model usage rate indicates that the larger the value, the more the dot influence value is reflected.

Regarding the dot model usage rate, a positive coefficient can be considered as, for example, a substantially positive coefficient. More specifically, for example, in the image processing apparatus 12, it is conceivable to formally use a negative value parameter as a parameter corresponding to the dot model usage rate due to convenience of calculation, and the like. In this case, the absolute value of the parameter can be considered as the dot model usage rate. Similarly, regarding the other parameters as well, a positive coefficient can be similarly considered as a substantially positive coefficient.

Furthermore, as described above, in the present example, quantization is performed by further reflecting the dither matrix noise and the quantization error other than the dot influence value. Moreover, in this case, similar to the case where the hybrid processing is performed, the error diffusion characteristics and the dither characteristics are used according to the input value by reflecting the dither matrix noise and the quantization error at a proportion that changes according to the input value (gradation). In the present example, the noise usage rate and the error usage rate as shown in the drawing are used as parameters indicating to what extent to use the respective characteristics.

In this case, the noise usage rate can be considered as, for example, a coefficient indicating a proportion to reflect the dither matrix noise in the quantization operation for the selected pixel. In this example, as the noise usage rate, for example, as shown in the drawing, a positive coefficient is used that indicates to reflect more dither matrix noise the larger the value. Furthermore, the error usage rate can be considered as, for example, a coefficient indicating a proportion to reflect the quantization error in the quantization operation for the selected pixel. Furthermore, as described above, in the present example, the quantization error is reflected in the quantization using the accumulated error obtained by accumulating the quantization errors generated at the periphery of the selected pixel. In this case, the accumulated error is one example of a peripheral error value based on an error caused by quantization with respect to each of a plurality of pixels at the periphery of the selected pixel. Furthermore, as the error usage rate, for example, as shown in the drawing, a positive coefficient is used that indicates to reflect more accumulated error the larger the value.

More specifically, in the present example, the noise usage rate and the error usage rate that change according to the input value are used, and the product of the dither matrix noise and the noise usage rate is added to the threshold to reflect the dither matrix noise. Furthermore, the quantization error is reflected by adding the product of the accumulated error and the error usage rate to the input value. According to the present example, for example, the proportion to reflect the dot influence value, the dither matrix, and the accumulated error can be changed variously according to the input value. Thus, for example, quantization corresponding to the input value can be appropriately performed.

Here, when quantization is performed by reflecting the dot model as in the present example, for example, if the reflection amount of the dot influence value in the halftone portion is too large, pattern noise such as a checkered pattern or the like, for example, may occur in the printing result. Furthermore, the influence of the overlapping of adjacent ink dots, for example, is considered to increase in at least one part of the highlight portion or at least one part of the shadow portion compared to the halftone portion. In this case, the halftone portion is, for example, a range indicated by reference symbol A3 in the drawing. Therefore, it is conceivable to use as the dot model usage rate, for example, a coefficient that changes so that the value in the halftone portion becomes smaller than the value in at least one part of the highlight portion and the value in the halftone portion becomes smaller than the value in at least one part of the shadow portion. According to such a configuration, for example, the occurrence of pattern noise, and the like can be appropriately prevented.

Furthermore, in the highlight portion and the shadow portion, for example, dot delay and tailing can be prevented by reflecting more dither matrix noise and enhancing the dither characteristics. More specifically, in the highlight portion, it is preferable to increase the noise usage rate and lower the dot model usage rate and error usage rate, for example, as shown in the range indicated by reference symbol A1 in the drawing. According to such a configuration, for example, the dot delay can be appropriately prevented. In the shadow portion, for example, it is preferable to increase the noise usage rate and lower the dot model usage rate and the error usage rate, for example, as shown in the range indicated by reference symbol A4 in the drawing. According to such a configuration, for example, occurrence of problems such as tailing can be appropriately prevented.

Furthermore, for example, it is preferable to use as the noise usage rate, a coefficient that changes so that a value in the vicinity of the central gradation becomes larger than the value in other portions in the halftone portion. The vicinity of the central gradation is, for example, a range indicated by reference symbol A3 in the drawing. The vicinity of the central gradation can be considered as, for example, a range of one part of the halftone portion. According to such a configuration, for example, the pattern noise of checkered pattern can be more appropriately prevented from occurring in the halftone portion.

Furthermore, in the halftone portion, for example, it is preferable to enhance the error diffusion characteristic by increasing the error usage rate. According to such a configuration, for example, smooth gradation property can be obtained more appropriately. More specifically, in the present example, for example, the error usage rate is set to the maximum value and the noise usage rate and the error usage rate are lowered, as shown in the drawing, in the halftone portion. In addition, as a countermeasure against the pattern noise described above, as shown in the drawing, the value in the vicinity of the central gradation is set slightly higher than the periphery thereof. According to the present example, for example, the quantization corresponding to the gradation of the image can be more appropriately performed.

Figure 12:
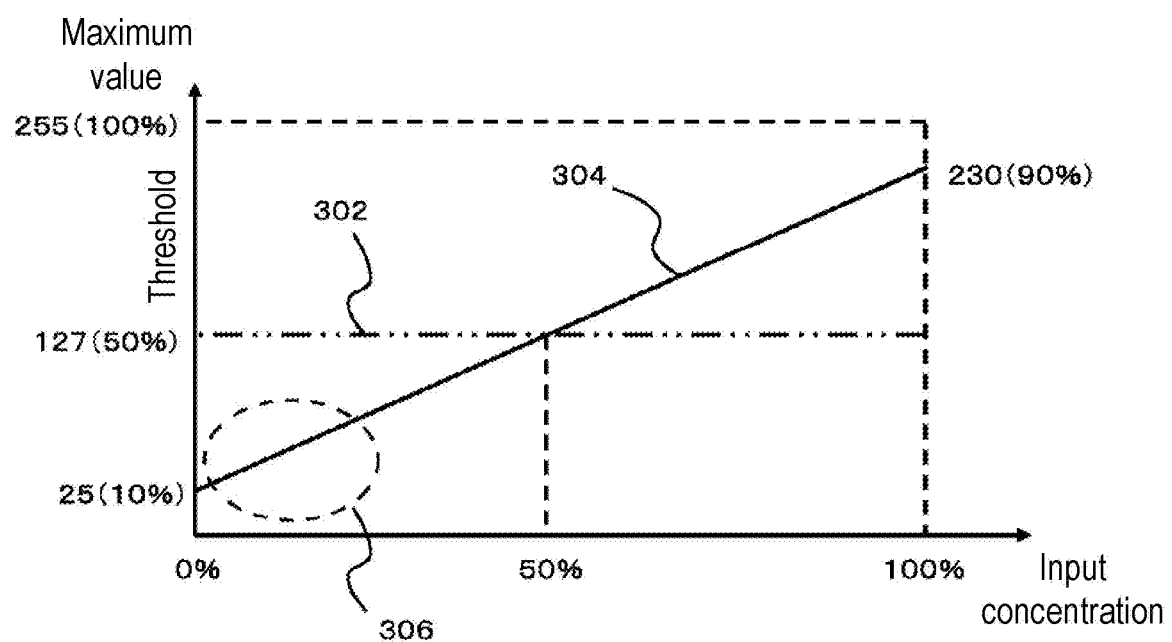
FIG. 12 is a view describing a dynamic threshold method.

Furthermore, as described above, in the present example, the dot delay is prevented by increasing the noise usage rate in the highlight portion or the like. However, in order to prevent the dot delay more reliably, for example, it is preferable to perform quantization through a method (dynamic threshold method) using a dynamic threshold which is a threshold in which the value dynamically changes. FIG. 12 is a view describing the dynamic threshold method.

For example, when quantization is performed through the conventional error diffusion processing, it is generally considered that a fixed threshold equal to the median value of the input values is used as the threshold. For example, when an 8-bit input value is used, 127 which is the median value of the values that can be expressed in 8 bits is used as the threshold, as indicated by a one-dot chain line 302 in the drawing. However, in this case, for example, since the input value is low in the highlight portion, the time until the value accumulated in the accumulated error exceeds the threshold becomes longer. As a result, for example, the dot delay is likely to occur after the position of the first dot is determined. On the other hand, in the dynamic threshold method, a threshold in which the value changes according to the input value is used, for example, as indicated by a solid line 304 in the drawing. Furthermore, in this case, the threshold in the highlight portion is decreased as in a portion surrounded by a broken line 306 in the drawing. According to such a configuration, for example, the time until the accumulated error exceeds the threshold can be appropriately shortened even in the highlight portion. Thus, for example, the dot delay can be more reliably prevented. The dynamic threshold method can be considered as, for example, a method of introduction for assisting dot delay countermeasures.

Figure 13:
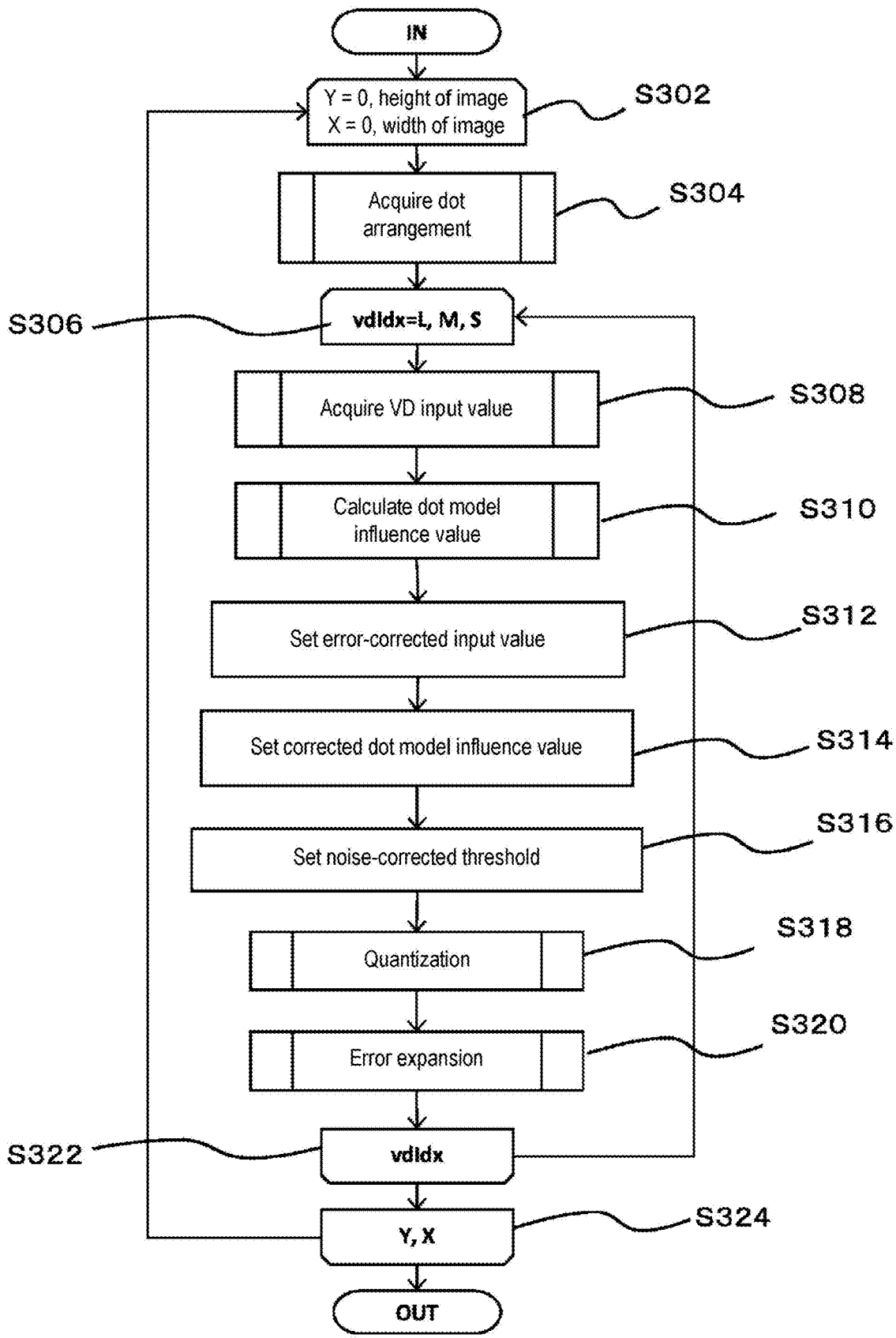
FIG. 13 is a flowchart showing one example of a quantization processing performed in the present example.

Next, the overall operation of the quantization processing will be described in more detail. FIG. 13 is a flowchart showing one example of the quantization processing performed in the present example. As described above, in the present example, the image processing apparatus 12 (see FIGS. 1A and 1B) sequentially selects each pixel of the input image and quantizes the pixel value of the selected pixel which is the selected pixel. In this quantization processing, for example, the calculation processing of the dot model, the error usage rate Re, the dot model usage rate Rdm, the noise usage rate Rn, the dynamic threshold, and the like described above are performed in advance, and the quantization is performed using the parameters. Furthermore, in this case, the quantization is performed for each color of ink used for printing (e.g., for each color of process color). Therefore, the flowchart shown in FIG. 13 can be considered as, for example, a quantization operation for one color.

Furthermore, in the flowchart shown in the drawing, each pixel of the input image is selected in order by the repetitive processing including step S302 and step S324. More specifically, in this case, the range corresponding to 0 to the width of the image is set as the range of X, assuming the width direction of the image is the X direction. Furthermore, the range corresponding to 0 to the height of the image is set as the range of Y, assuming the height direction of the image is the Y direction. Then, the values of X and Y are sequentially changed every time the operations of steps S304 to S322 are performed and step S324 is reached, and the repetitive processing including step S302 and step S324 are performed to quantize the pixel value of the selected pixel (processing pixel) sequentially selected as the processing target.

In this case, after the selected pixel is selected in step S302, the arrangement of dots at the periphery of the selected pixel is acquired as preparation for using the dot model (S304). In the present example, the range to be acquired is a range corresponding to the dot model of a dot of the largest size. Furthermore, following this processing, the quantization operation is performed for each dot size by the repetitive processing including step S306 and step S322. More specifically, as described above, in the present example, L dots, M dots, and S dots are used as ink dots. In this case, first, the quantization operation corresponding to the L dot is performed by the operations of steps S308 to S320 between step S306 and step S322. Thereafter, similarly, the quantization operation corresponding to the M dot is performed, and further the quantization operation corresponding to the S dot is performed.

In the quantization operation corresponding to the respective size, a value to be used as the input value in the quantization operation corresponding to the respective size is determined using the VD curve associating the output proportion of the dots of a plurality of sizes and the input value (input concentration) (S308). In this case, as the VD curve, for example, the curve shown in FIG. 8B can be used. The output proportion corresponding to each dot size can be uniquely determined with respect to the input value by using such VD curve. Furthermore, in the quantization operation corresponding to the respective size, the following operations are performed while handling the output proportion obtained based on the VD curve as the input value In corresponding to the relevant size.

Subsequently, based on the arrangement of dots acquired in step S304, a dot influence value (dot model influence value) with respect to the selected pixel is calculated (S310). More specifically, in this case, for example, the dot influence value received by the position of the selected pixel from the peripheral dots of the selected pixel is calculated by using the dot model shown in FIG. 5. In the present example, as described above with reference to FIG. 7C and the like, when a large size dot is preferentially arranged, the dot influence value is calculated in consideration of the influence from the dots of larger size based on the arrangement of dots having a larger size than the dot size being considered for arrangement to the position of the selected pixel. In this case, for example, at the time of processing with respect to the M dots, the influence of L dots and M dots is received, and the influence of S dots is ignored. Furthermore, at the time of processing of the S dots, the influences of L dots, M dots, and S dots are received. In the following processing, the dot influence value calculated in step S310 is referred to as a dot model influence value DMV.

Subsequently, using the error usage rate, the dot model usage rate, the noise usage rate, and the like are used to set the error-corrected input value In' (S312), set the corrected dot model influence value DMV' (S314), and set the noise-corrected threshold Th' (S316). In this case, the error-corrected input value In' is an input value after adjustment based on the accumulated error. The corrected dot model influence value DMV' is a dot influence value performed with adjustment based on the dot model usage rate Rdm. The noise-corrected threshold Th' is a threshold that has been performed with adjustment based on the dither matrix noise.

More specifically, in step S312, as the accumulated error value Err' which is a value of the accumulated error, the accumulated error value Err' corresponding to the position (coordinate) of the selected pixel is selected from the error value Err accumulated in the accumulated error buffer. Furthermore, in the present example, the differential corrected input value In' is set so that ((error-corrected input value In')=(input value In)+(accumulated error value Err')×(error usage rate Re) is obtained by using the error usage rate Re that changes as shown in FIG. 11 and adding the product of the error usage rate Re and the accumulated error value Err' to the input value In. In step S314, a corrected dot model influence value DMV' is set so that (corrected dot model influence value DMV')=(dot model influence value DMV)×(dot model usage rate Rdm) is obtained by multiplying the dot model usage rate Rdm that changes as shown in FIG. 11 with respect to the dot model influence value DMV calculated in step S310.

Furthermore, in step S316, the noise-corrected threshold Th' is set so that (noise-corrected threshold Th')=(threshold Th)+(noise value No)×(noise usage rate Rn) is obtained by adding a value obtained by multiplying the noise usage rate Rn that changes as shown in FIG. 11 to the noise value No which is the dither matrix noise acquired from the dither matrix with respect to the threshold Th. In this case, for example, the dynamic threshold described with reference to FIG. 12 and the like is used as the threshold Th. As the noise value No, the dither matrix noise selected according to the position (coordinate) of the selected pixel from the dither matrix (e.g., dither matrix used in the quantization in the process color being processed) prepared for each color of ink.

As the dither matrix corresponding to each color of ink, for example, it is conceivable to use matrices different from each other. According to such a configuration, for example, a dither mask used in the quantization of a pixel at one position can be made different for each color of ink. In addition, for example, the noise value No can be made different for each color of ink thereby making it difficult for dots to overlap.

Furthermore, following the setting of the error-corrected input value In', the corrected dot model influence value DMV', and the noise-corrected threshold Th', the quantization is performed on the selected pixel using these values (S318). In this case, when referring to executing the quantization, this means, setting the output value Ht of the quantization by comparing the error-corrected input value In' and the noise-corrected threshold Th', for example, as described above with reference to FIG. 9 and the like.

Furthermore, in the present example, as described above with reference to FIG. 9, the comparison between the error-corrected input value In' and the noise-corrected threshold Th' is performed by reflecting the dot influence value. More specifically, in this case, adjustment of subtracting the corrected dot model influence value DMV' calculated in step S314 from the error-corrected input value In' calculated in step S312 is performed. Then, the output value Ht is set by comparing the value obtained by this adjustment with the noise-corrected threshold Th'. Then, according to the output value Ht, for example, an error (quantization error) caused by quantization is calculated, as described above with reference to FIG. 9.

Furthermore, the calculated error is diffused to the peripheral pixels in the manner same as or similar to the known error diffusion method. More specifically, in this case, for example, the error is diffused based on a diffusion matrix prepared in advance. The known diffusion matrix can be suitably used as the diffusion matrix. Furthermore, the error to be diffused is accumulated in, for example, the accumulated error buffer, and is used at the time of quantization for a pixel selected thereafter. According to the present example, for example, the quantization processing can be performed appropriately.

Next, supplementary explanation on the configuration described above, explanation of modified examples and the like will be made. As described above, in the present example, the quantization processing using the dot model is performed, as shown in FIG. 3A, for example, for each color of ink used for printing in the printing apparatus 14 (see FIGS. 1A and 1B). However, in the modified example of the operation of the image processing apparatus 12 (see FIGS. 1A and 1B), the quantization processing using the dot model may not be performed on all colors and the quantization processing using the dot model may be performed only on some colors. In this case, for example, it is conceivable to perform the quantization processing using the dot model only on colors in which the influence of the overlapping of dots tends to stand out.

In the printing system 10, for example, it is considered to use, for some colors, dark ink which is ink having a relatively dark color (dark ink) and light ink which is ink having a relatively light color. More specifically, in this case, the printing apparatus 14 includes, for example, a dark ink head which is an inkjet head that ejects dark ink and a light ink head which is an inkjet head that ejects light ink, for at least some colors. Furthermore, in the image processing apparatus 12, for example, a quantization operation for determining the position to eject the dark ink from the dark ink head, and a quantization operation for determining the position to eject the light ink from the light ink head are performed.

In this case, the influence of overlapping of adjacent ink dots is considered to become larger in the dark ink of the dark ink and the light ink. Therefore, as a quantization operation (quantization for dark ink) for determining the position to eject the dark ink, it is preferable to perform the quantization operation using the dot model, for example, as shown in FIG. 3A. According to such a configuration, for example, in the quantization for dark ink, it can be performed more appropriately in consideration of the influence of overlapping of adjacent ink dots. Further, in this case, the influence of overlapping of adjacent ink dots becomes relatively small for the light ink. In this case, for example, it may be preferable to perform quantization at high speed rather than considering such an influence. Thus, as a quantization operation (quantization for light ink) for determining a position to eject the light ink, it is considered to perform quantization through a method other than the quantization using the dot model. More specifically, as quantization for light ink, for example, it is conceivable to perform quantization through the dither method using the dither matrix noise. According to such a configuration, for example, the quantization for light ink can be performed at high speed and appropriately.

When dark ink and light ink are used as described above, for example, it is conceivable to perform separation by a known separation processing (light separation processing) when the light ink and the dark ink are used, for example, for the input value of the colors corresponding to the dark ink and the light ink. More specifically, in this case, for example, it is conceivable to separate the input values of the colors corresponding to the dark ink and the light ink into a dark ink curve value indicating the output proportion of the dark ink and a light ink curve value indicating the output proportion of the light ink. In this case, the quantization using the dot model is performed on the dark ink curve value and the quantization through the dither method is performed on the light ink curve value to acquire the respective output values. According to such a configuration, the quantization processing with respect to all the colors can be performed appropriately, for example, in the processing time comparable with the case where light ink is not used. In this case, the light ink is considered to have little influence on the graininess and the concentration unevenness in the printing result. Thus, even if the quantization for the light ink is performed in such a manner, the influence on the printing quality is less likely to occur. Therefore, according to such a configuration, for example, the quantization processing for all colors can be performed at high speed and appropriately while maintaining printing quality.

In the description made above, a case where the quantization error or the dither matrix noise is further used has been mainly described for the quantization processing using the dot model. In this regard, in principle, for example, it is possible to perform quantization by reflecting only the dot influence value based on the dot model without using the quantization error or the dither matrix noise. In addition, when quantization is performed in such manner, an effect of reducing concentration unevenness can be obtained by using a dot model. However, when it is considered to perform quantization with higher quality, it is preferable to perform the quantization by further reflecting the quantization error as described above. It is more preferable to perform the quantization by further reflecting the dither matrix.

In the description made above, a case where the error diffusion method is used has been mainly described for the method of performing the quantization by reflecting the quantization error. However, in the modified example of the operation of the image processing apparatus 12, the quantization error may be reflected through a method other than the error diffusion method. In this case, for example, although the method is different from the error diffusion method in a strict definition, it is conceivable to use various methods that can obtain substantially the same effect as the error diffusion method. More specifically, it is conceivable to use, for example, an average error minimum method or the like as a method of performing quantization by reflecting the quantization error. In this case, for example, as in the case where the error diffusion method is used, it is conceivable to use the average error minimum method while changing the proportion to reflect in the quantization operation according to the error usage rate.

In the description made above, the quantization processing in a case where ink dots (VD) of a plurality of sizes are used has been mainly described. However, it is also conceivable to use a configuration that can form only a dot of one size (ND: Normal Dot) as the printing apparatus 14. In this case, for example, it is conceivable to perform the quantization operation for the dot of one size in a manner same as or similar to the quantization operation for one size (e.g., L dot) of a plurality of sizes in VD.

INDUSTRIAL APPLICABILITY

The present disclosure can be suitably used in, for example, a printing system.

What is claimed is:

1. A printing system that performs printing on a medium through an inkjet method, the printing system comprising:
   an image processing portion, being configured to perform an image processing on an input image that indicates an image to be printed, the image processing portion generating an image in which a gradation number of a pixel value is smaller than the input image as a generated image which is an image generated by the image processing; and
   a printing portion, being configured to execute printing on the medium based on the generated image generated by the image processing portion;
   wherein
   the printing portion includes an inkjet head that ejects ink onto the medium, the inkjet head forming ink dots on the medium by ejecting ink to a position set on the medium in correspondence with each pixel in the generated image;
   the image processing portion is configured to:
   generate the generated image by performing a quantization processing for performing quantization by comparing a pixel value of each pixel in the input image with a threshold that is preset; and
   the image processing portion is further configured to:
   in the quantization processing, calculate a dot influence value which is a value indicating to what extent the position corresponding to a selected pixel, which is a pixel of the input image selected as a target of quantization, is covered by the ink dot formed at the position set on the medium in correspondence with peripheral pixels of the selected pixel, the dot influence value being calculated based on a dot model which is data obtained by modeling a relationship between a size of the ink dot and a printing resolution,
   perform adjustment that reflects the dot influence value on at least one of the pixel value of the selected pixel or the threshold, and then
   compare the pixel value with the threshold.

2. The printing system according to claim 1, wherein the dot model indicates, with respect to one ink dot formed at the position of one pixel in the resolution, to what extent the ink dots cover the positions of pixels other than the one pixel.

3. The printing system according to claim 1, wherein the image processing portion is configured to further perform quantization on the selected pixel based on a peripheral error value which is a value based on an error caused by quantization with respect to each of a plurality of pixels at the periphery of the selected pixel.

4. The printing system according to claim 1, wherein the image processing portion is configured to reflect the dot influence value at a proportion that changes according to the pixel value of the selected pixel, and perform quantization on the selected pixel.

5. The printing system according to claim 4, wherein the image processing portion is configured to:
   reflect the dot influence value based on a dot influence value usage rate which is a positive coefficient indicating a proportion to reflect the dot influence value in a quantization operation with respect to the selected pixel and which indicates reflecting more dot influence value the larger the value to perform adjustment based on the dot influence value with respect to at least one of the pixel value of the selected pixel or the threshold,
   define a range of gradation including a central gradation of the gradations indicated by the pixel values of the pixels in the input image as a halftone portion, define a range of gradation in which the pixel value is smaller than the halftone portion as a highlight portion, and define a range of gradation in which the pixel value is larger than the halftone portion as a shadow portion,
   wherein the dot influence value usage rate changes so that a value in the halftone portion is smaller than the value in at least one part of the highlight portion, and a value in the halftone portion is smaller than the value in at least one part of the shadow portion.

6. The printing system according to claim 5, wherein the image processing portion is configured to:
   perform quantization on the selected pixel based further on a peripheral error value which is a value based on an error caused by quantization on each of a plurality of pixels at the periphery of the selected pixel, and
   perform quantization by reflecting the peripheral error value based on an error usage rate which is a coefficient indicating a proportion to reflect the peripheral error value in the quantization operation with respect to the selected pixel.

7. The printing system according to claim 6, wherein the image processing portion is configured to:
   perform quantization by further using a dither matrix noise which is noise specified by a preset dither matrix, and
   perform quantization by reflecting the dither matrix noise based on a noise usage rate which is a coefficient indicating a proportion to reflect the dither matrix noise in the quantization operation with respect to the selected pixel.

8. The printing system according to claim 7, wherein
   the noise usage rate is a positive coefficient indicating to reflect more dither matrix noise the larger the value, and
   in the halftone portion, changes so that a value near the central gradation is larger than the value in other parts.

9. The printing system according to claim 1, wherein the image processing portion is configured to:
   perform only one quantization with respect to each pixel in the input image in the quantization operation corresponding to one type of ink, and
   calculate, as the dot influence value used in the quantization with respect to the selected pixel, a value indicating to what extent the position corresponding to the selected pixel is covered by the ink dot formed at a position corresponding to a pixel where quantization has already been completed before performing quantization on the selected pixel.

10. The printing system according to claim 1, wherein
   the printing portion is configured to form the ink dots of a plurality of sizes as the ink dots;
   the image processing portion is configured to:
   perform quantization for every size of the ink dot to generate the generated image indicating the position to form the ink dot of each size, and
   perform the quantization performed for every size of the ink dot in order from the quantization corresponding to a large size; and
   in the quantization operation corresponding to each size, perform the quantization while handling a position where an ink dot of a larger size is determined to be formed as a position where an ink dot of a size being processed is formed.

11. The printing system according to claim 1, wherein the printing portion includes, for at least some colors,
a dark ink head which is an inkjet head that ejects dark ink, which is an ink having a relatively dark color, and
a light ink head which is an inkjet head that ejects light ink, which is an ink having a relatively light color; and
the image processing portion is configured to:
perform a quantization operation for determining a position to eject the dark ink by the dark ink head, and a quantization operation for determining a position to eject the light ink by the light ink head,
perform quantization using the dot influence value as a quantization operation for determining the position to eject the dark ink, and
perform quantization through a dither method using the dither matrix noise which is noise specified by a preset dither matrix without using the dot influence value as a quantization operation for determining the position to eject the light ink.

12. An image processing apparatus that performs image processing on an input image that indicates an image to be printed in a printing system that performs printing on a medium through an inkjet method, wherein the image processing apparatus is configured to:
generate an image in which a gradation number of a pixel value is smaller than the input image as a generated image which is an image generated by the image processing,
perform quantization processing of performing quantization by comparing a pixel value of each pixel in the input image with a preset threshold to generate the generated image, and the image processing portion is further configured to:
in the quantization processing, calculate a dot influence value which is a value indicating to what extent the position corresponding to a selected pixel, which is a pixel of the input image selected as a target of quantization, is covered by the ink dot formed at the position set on the medium in correspondence with a peripheral pixel of the selected pixel, the dot influence value being calculated based on a dot model which is data obtained by modeling a relationship between a size of the ink dot and a printing resolution,
perform adjustment that reflects the dot influence value on at least one of the pixel value of the selected pixel or the threshold, and then
compare the pixel value with the threshold.

13. A print method of performing printing on a medium through an inkjet method, the print method comprising:
generating, by an image processing portion that performs image processing on an input image that indicates an image to be printed, an image in which a gradation number of a pixel value is smaller than the input image as a generated image which is an image generated by the image processing; and
executing, by a printing portion that executes printing on the medium, printing on the medium based on the generated image generated by the image processing portion;
wherein
the printing portion includes an inkjet head that ejects ink onto the medium, the inkjet head forming ink dots on the medium by ejecting ink to a position set on the medium in correspondence with each pixel in the generated image,
the image processing portion is configured to:
generate the generated image by performing a quantization processing for performing quantization by comparing a pixel value of each pixel in the input image with a preset threshold, and
the image processing portion is further configured to:
in the quantization processing, calculate a dot influence value which is a value indicating to what extent the position corresponding to a selected pixel, which is a pixel of the input image selected as a target of quantization, is covered by the ink dot formed at the position set on the medium in correspondence with a peripheral pixel of the selected pixel, the dot influence value being calculated based on a dot model which is data obtained by modeling a relationship between a size of the ink dot and a printing resolution,
perform in adjustment that reflects the dot influence value on at least one of the pixel value of the selected pixel or the threshold, and then
compare the pixel value with the threshold based on a value after adjustment.

* * * * *